United States Patent [19]

Roberts et al.

[11] Patent Number: 4,839,804

[45] Date of Patent: Jun. 13, 1989

[54] METHOD AND APPARATUS FOR INSURING THE FUNDING OF A FUTURE LIABILITY OF UNCERTAIN COST

[75] Inventors: Peter A. Roberts; John D. Finnerty, both of New York, N.Y.

[73] Assignee: College Savings Bank, Princeton, N.J.

[21] Appl. No.: 947,614

[22] Filed: Dec. 30, 1986

[51] Int. Cl.$^4$ ............................................. G06F 15/21
[52] U.S. Cl. ..................................... 364/408; 364/300
[58] Field of Search .............................. 364/400–402, 364/406, 408, 300, 715–716, 735

[56] References Cited

U.S. PATENT DOCUMENTS 4,642,768  2/1987  Roberts ................................ 364/408
4,722,055  1/1988  Roberts ................................ 364/408

Primary Examiner—Allen MacDonald
Attorney, Agent, or Firm—Laurence S. Rogers; Jeffrey H. Ingerman

[57] ABSTRACT

A method and apparatus are provided to insure a means of purchasing a floating rate zero coupon note that is designed to fund a certain future liability of uncertain value and thereby defease fully its future cost. The method is a one-year renewable term insurance program that fully funds the purchase of a certain floating rate zero coupon note upon the occurrence of some catastrophic event, such as the death of the insured. The system projects the expected death benefit payment and then calculates the annual insurance premium based on the expected death benefit payment, type of policy, and personal and risk characteristics of the insured.

66 Claims, 16 Drawing Sheets

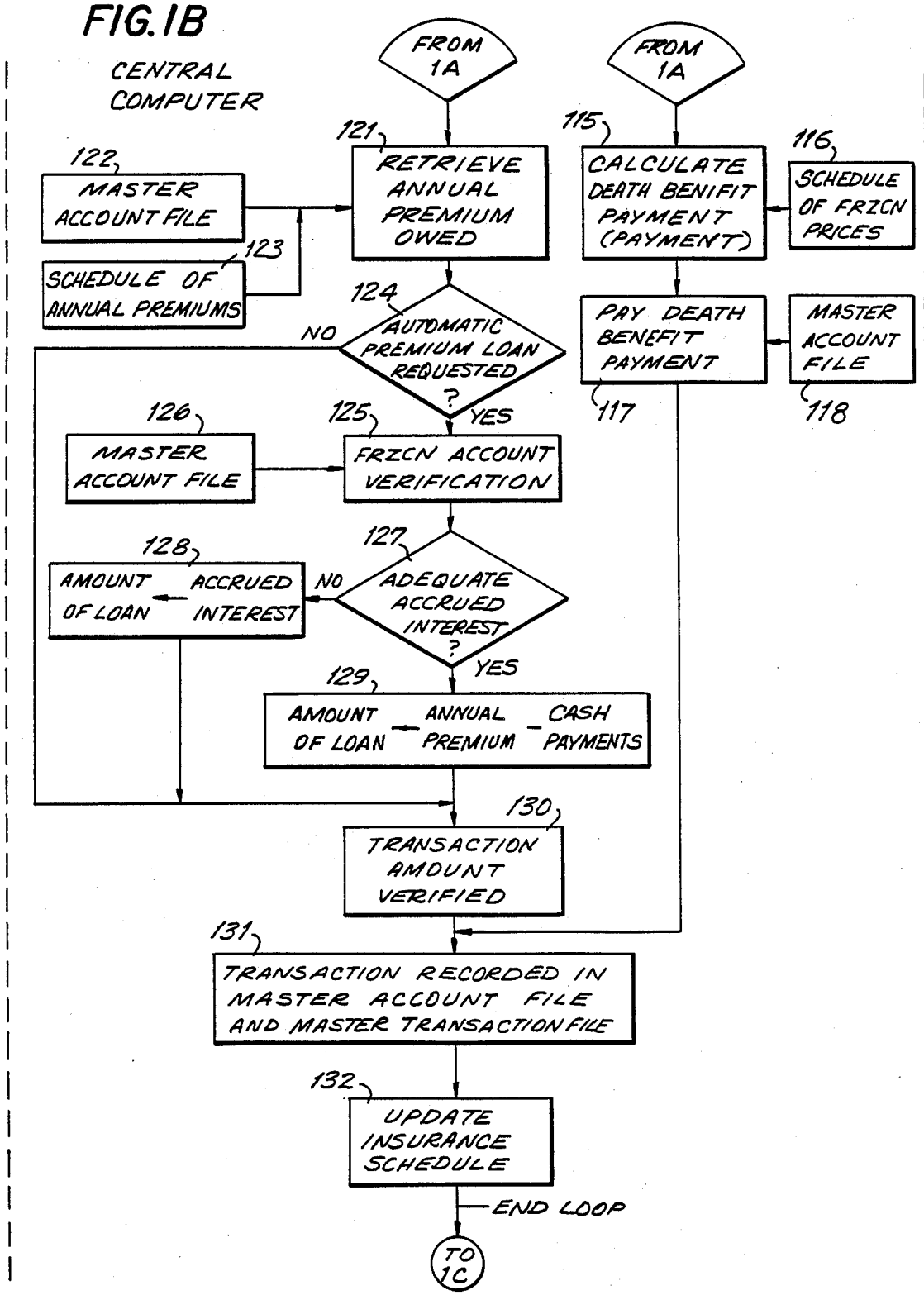

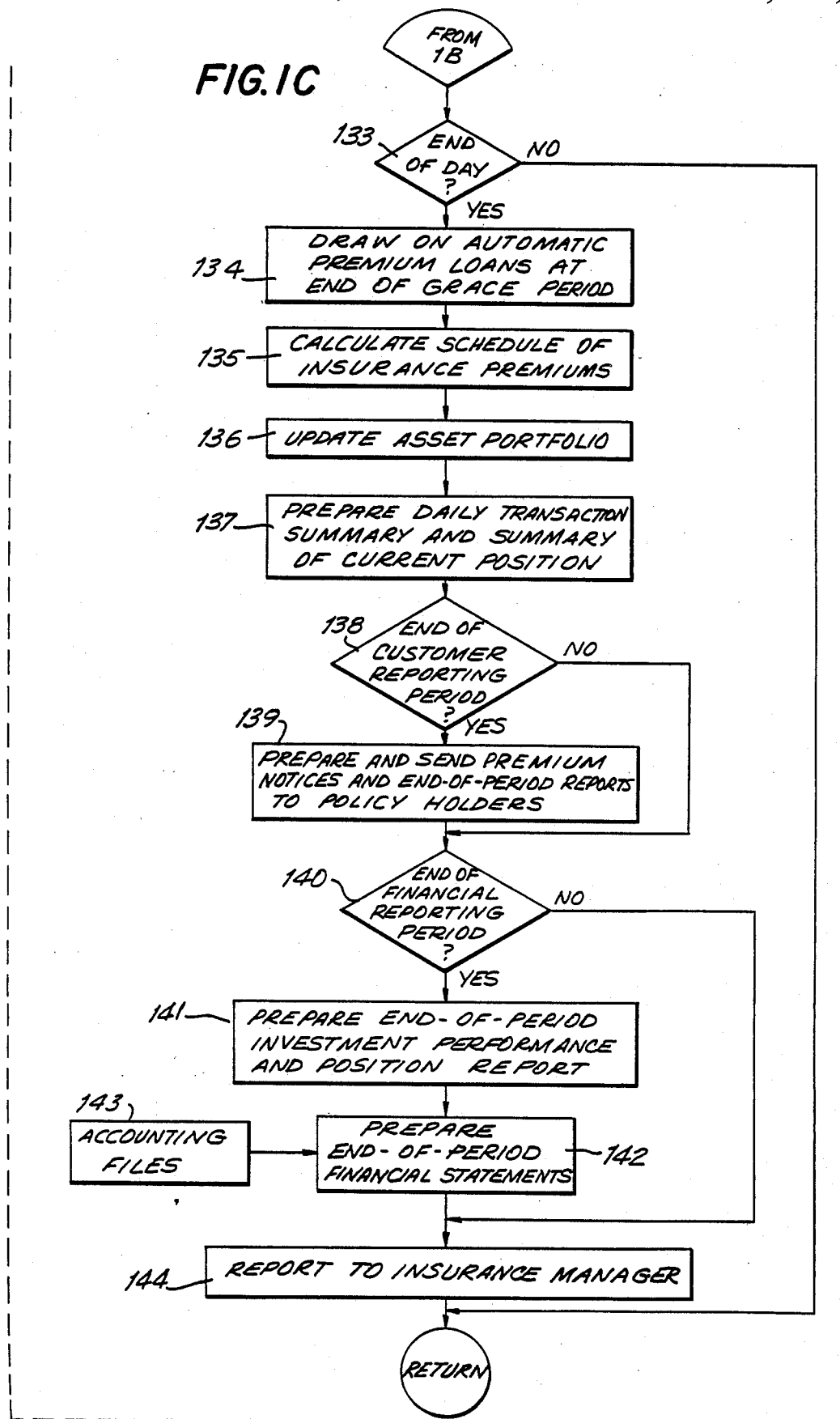

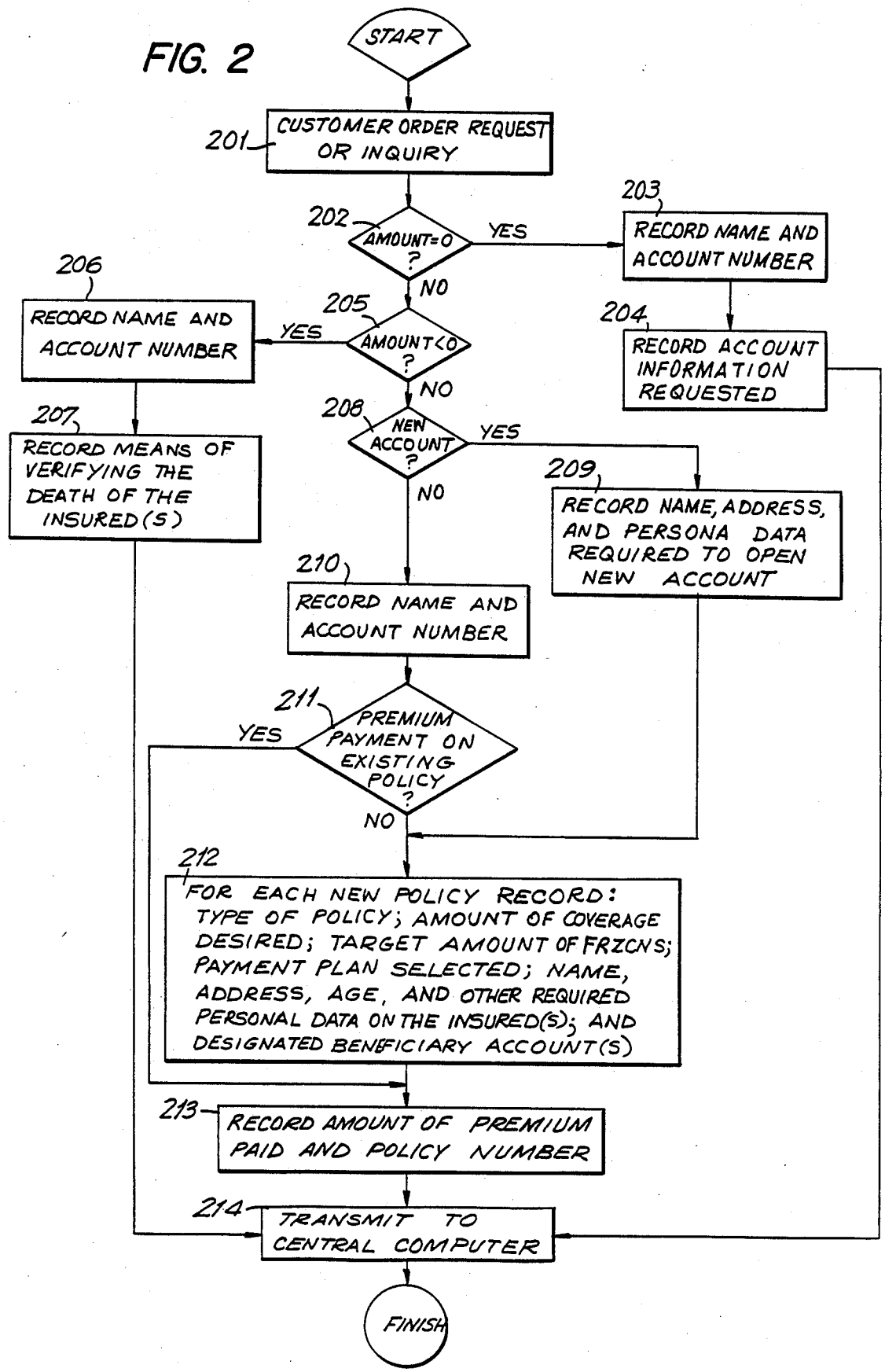

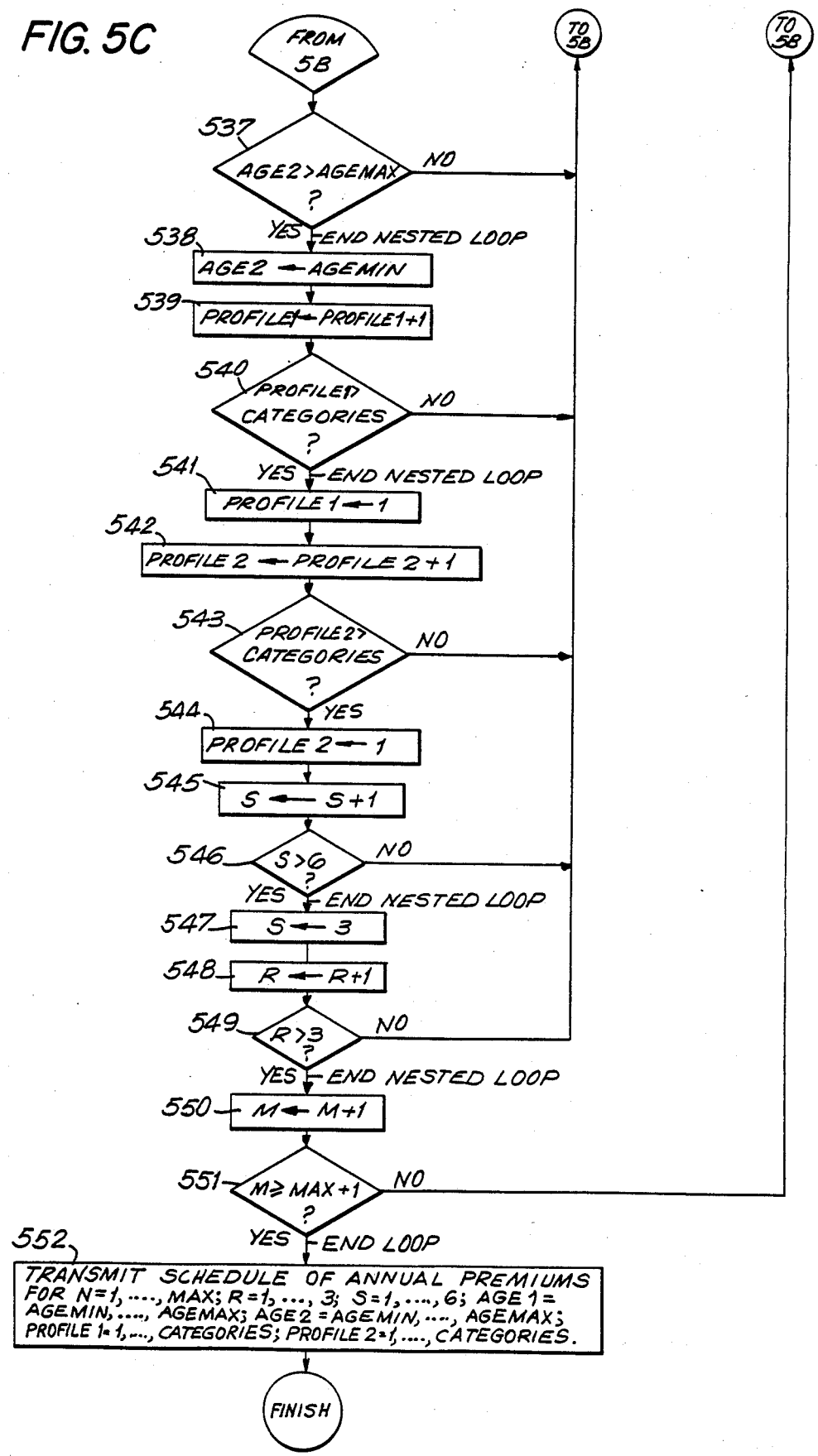

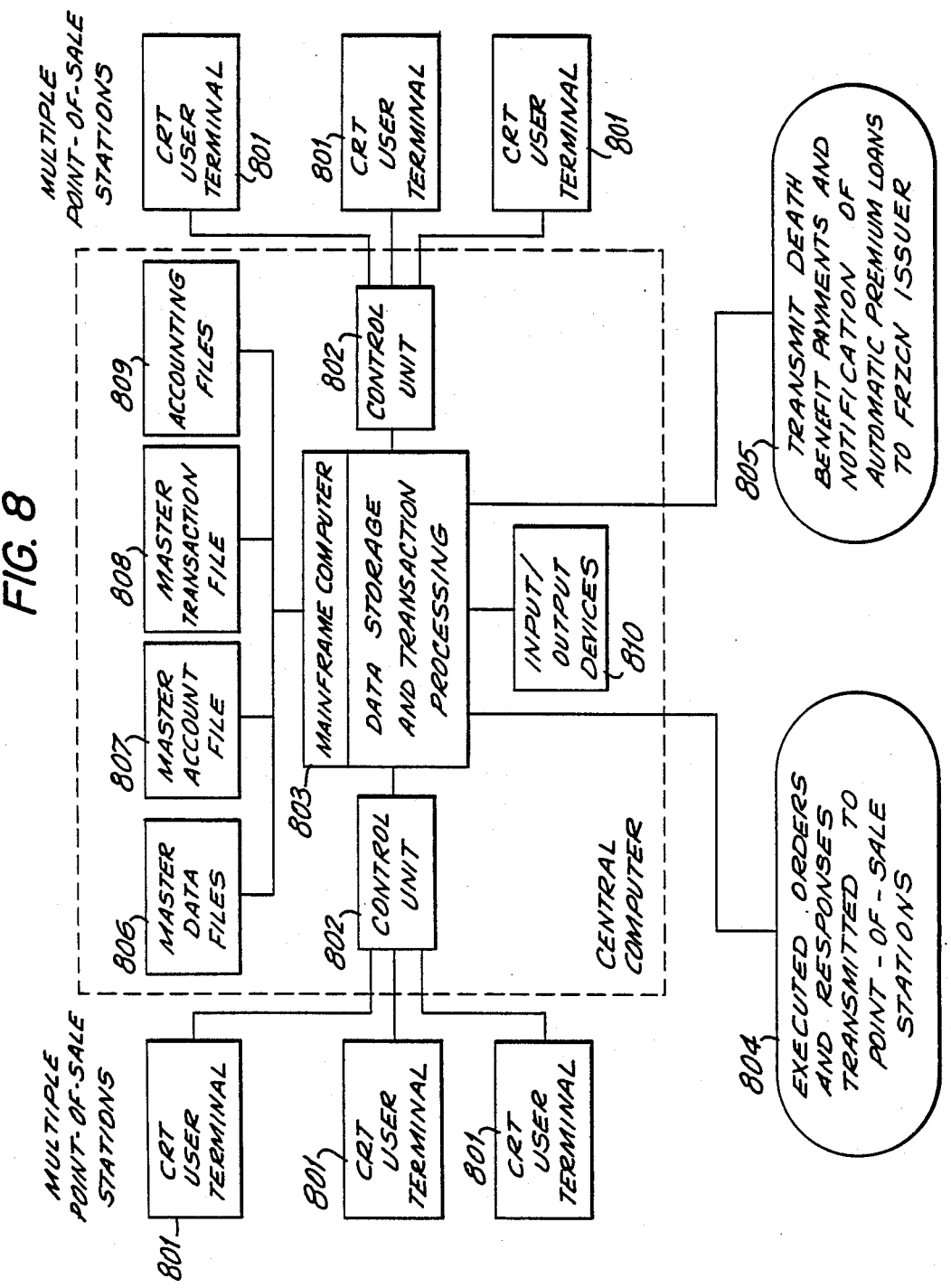

METHOD AND APPARATUS FOR INSURING THE FUNDING OF A FUTURE LIABILITY OF UNCERTAIN COST

BACKGROUND OF THE INVENTION

This invention relates to data processing methods and apparatus for implementing and administering a program for insuring the funding of a future liability of uncertain future cost when that liability can be funded fully prior to the projected date of the liability at a cost that is known and fixed at the date of funding. In particular, this invention relates to a data processing method and apparatus for issuing floating rate zero coupon note purchase insurance to insure the availability of financial means for purchasing a floating rate zero coupon note or other similar financial contract or obligation, which is designed to fund fully a future liability whose projected due date and whose present cost are known but whose future cost is unknown, upon the death of the prospective purchaser of the floating rate zero coupon note. More generally, this invention relates to a data processing method and apparatus for issuing such insurance in the form of one-year renewable-term life insurance and for funding this insurance program such that the funds available through the investment of the proceeds from the sale of the insurance and the reinvestment of interim cash flow will be sufficient to cover in full or in predetermined part in a timely manner the cost of purchasing the floating rate zero coupon note whose purchase is insured in the event the person on whom the insurance policy was written should die during the term of the policy.

The floating rate zero coupon note whose purchase is being insured carries an interest rate which varies automatically with the rate of inflation of the cost of some specified service or commodity and its interest payments are automatically reinvested, so as to fund fully the currently uncertain cost of the service or commodity at a future date. When all the interest payments are reinvested, the value of the floating rate zero coupon note (initial principal plus accrued and reinvested interest) increases over time in a manner that assures that the value of the floating rate zero coupon note as of its maturity date equals as of that date the cost of the service or commodity that was to be defeased.

The price charged for a floating rate zero coupon note, which together with the number or fraction of floating rate zero coupon notes whose purchase is insured determines the amount of the death benefit payable under the floating rate zero coupon note purchase insurance policy, depends on the current most of the service or commodity, the projected rate of escalation in the cost of this service or commodity over the life of the floating rate zero coupon note, current interest rates, projected future interest rates, the risk premium that compensates the floating rate zero coupon note issuer for assuming the cost escalation risk and the floating rate zero coupon note issuer's target profit margin. Specifically, the price of a floating rate zero coupon note is obtained by first escalating the current cost of the service or commodity at the projected rate of escalation in the cost of this service or commodity, and then discounting this escalated value at a rate that equals (1) the projected yield to be realized on the investment of the proceeds to be received from the sale of the floating rate zero coupon note and on the reinvestment of interim cash flows minus (2) the risk premium and minus also (3) the target profit margin. Although not essential to the operation or understanding of this invention, further details of the floating rate zero coupon note are provided in copending, commonly-assigned U.S. patent application Ser. No. 849,779, filed Apr. 9, 1986, entitled "Method and Apparatus for Funding a Future Liability of Uncertain Cost."

The floating rate zero coupon note is designed to fund a future liability whose projected due date and whose present cost are known and whose future cost is unknown but can be projected with some risk factor. The floating rate zero coupon note is different from traditional insurance programs, mutual funds and other investment programs, which only hedge a future liability, because it defeases the future liability. It will cover fully the cost of the service or commodity on the projected due date, eliminating to the purchaser of the note the risk of underfunding.

However, the risk of underfunding is fully eliminated only if the purchaser pays in full the purchase price of one full unit of the floating rate zero coupon note. Personal budget constraints might preclude a one-time purchase of a full unit, requiring multiple purchases of fractional units over time in order to accumulate one full unit, or the purchase of a full unit on an installment basis. If the person is purchasing the floating rate zero coupon note on behalf of someone else, multiple purchases of fractional units or installment purchases expose the beneficiary to the risk that the purchaser's death could occur before the purchase of a full unit is fully funded. For example, if the floating rate zero coupon note is intended to fund the uncertain future cost of one year of college education and a parent who is purchasing fractional floating rate zero coupon notes on behalf of a child dies before a full unit has been purchased, the surviving parent or others will have to raise the cash from other sources to pay for the balance of the floating rate zero coupon note. However, the day-to-day purchase price of the floating rate zero coupon note may increase as a function of increases in the rate of inflation of the future cost of college. Insurance proceeds from a conventional life insurance policy on the deceased might be able to cover this uncertain purchase price, if there is adequate insurance and if the insurance proceeds are not needed for other purposes. But traditional life insurance programs are not designed to fund fully a potential future liability of uncertain cost, such as the purchase price of a floating rate zero coupon note which may escalate over time with the rate of inflation of the future cost of college or some other specified service or commodity.

Accordingly, there is a need for an insurance method which will fully fund a potential future liability of uncertain cost, such as the purchase price of a floating rate zero coupon note or other similar financial contract or obligation, which ties the insurance benefit directly to the price of the underlying uncertain cost, so that the future liability will be fully funded in the event of the premature death of the person funding the liability.

SUMMARY OF THE INVENTION

In view of the foregoing, it is an object of this invention to provide a data processing method and apparatus for implementing a life insurance program which provides the beneficiary a benefit sufficient to cover fully the uncertain future cost of a floating rate zero coupon note, which is designed to fund an uncertain future liability whose cost can be projected on the basis of current cost data and assumptions regarding the rate of change of that data, and which automatically determines the insurance premiums that must be charged in order properly to fund the insurance program.

It is a more particular object of this invention to provide data processing methods and apparatus for implementing a life insurance program which provides a parent or relative who wishes to purchase floating rate zero coupon notes designed to defease the uncertain future cost of a college education for a child with assurance that the child's education will be fully funded in the event the parent or relative should die before he or she can fully purchase the full complement of floating rate zero coupon notes needed to defease the cost of the child's college education.

It is a further object of this invention to provide a data processing method and apparatus for issuing one-year renewable term life insurance that will provide the purchaser assurance that the beneficiary will be able to purchase a floating rate zero coupon note that will defease the future cost of some specified liability in full. A data processing method and apparatus are also provided for funding the obligations that arise out of the sale of floating rate zero coupon note purchase insurance when the cost of the uncertain future liability can be somewhat reasonably projected on the basis of the current cost of covering the liability if the liability were payable currently, and on assumptions regarding the expected rate of escalation in the cost of funding the liability in the future. As such, the floating rate zero coupon note purchase insurance imposes on the seller of such insurance the risk of death of the insured.

It is a still more particular object of this invention to provide a data processing method and apparatus for issuing one-year renewable term life insurance which provides a parent or relative who wishes to purchase floating rate zero coupon notes designed to fund the uncertain future cost of a college education for a child with the assurance that the child's education will be fully funded in the event the parent or relative should die before he or she can purchase the full complement of floating rate zero coupon notes needed to defease the cost of the child's college education. A data processing method and apparatus are also provided for funding the obligations that arise out of the sale of the one-year renewable term life insurance wherein the purchaser's initial premium followed by a periodic sequence of premiums on specified dates are invested and interim cash flows are reinvested so as to achieve an overall rate of return that will be sufficient to cover in full in a timely manner the cost of purchasing floating rate zero coupon notes upon the death of the insured sufficient to defease the cost of a college education for the beneficiary of the insured.

These and other objects of the invention are accomplished by providing a data processing system which implements an insurance program that protects an individual against the risk that the person who intended to purchase floating rate zero coupon notes on behalf of the individual dies before funding the purchase fully, for example, the risk that a parent dies before funding fully the purchase of floating rate zero coupon notes designed to defease the cost of a child's future college education.

The data processing system provides a method and apparatus for calculating automatically the amount of the death benefit payment to be made to certain designated beneficiary accounts upon the death of the insured; a method and apparatus for drawing automatic premium loans to make a premium payment at the end of the premium payment grace period; and a method and apparatus for establishing the schedule of annual premiums to be charged for the floating rate zero coupon note insurance based on the maturity of the floating rate zero coupon note, type of life insurance policy selected, sex and risk profile of the insured, and the current and forecasted future rate of college cost escalation, current and forecasted general inflation rates, the projected yields available on investment instruments, the floating rate zero coupon note insurer's risk premium, and the floating rate zero coupon note issuer's target profit margin.

The system also provides guidance in the management of the insurer's funds, which consist of insurance premiums and interim cash flow realized upon the investment of insurance premiums, so that the average yield on the investment portfolio at least matches the projected cost of the life insurance liabilities and so that the projected insurance liability stream is covered period by period. The system automatically handles the periodic processing of customer orders and periodic billing for and receipt of insurance premiums; updates the net asset position of the insurance fund; monitors investment performance; furnishes information on a regular basis to the insurance manager to permit the manager to establish investment objectives and make investment decisions consistent with regulatory constraints and, in any case, with properly funding the insurance liabilities; provides information to the insurance manager regarding the composition of the asset portfolio and the composition of the forecasted insurance liability stream; sends premium notices and reports to insurance account holders; and prepares end-of-period financial statements.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 1A–1C are a flow chart depicting the data processing methodology and structure in accordance with the principles of the invention;

FIG. 2 is a flow chart depicting in more detail the point-of-sale station to central computer interface represented by block 105 in FIG. 1A;

FIGS. 5A–5C are a flow chart depicting in more detail the method and apparatus for establishing the schedule of premiums to be charged for the insurance represented be block 135 in FIG. 1B;

FIG. 8 is a block diagram of a computer system suitable for implementing the invention.

DETAILED DESCRIPTION OF THE INVENTION

Figure 1A:
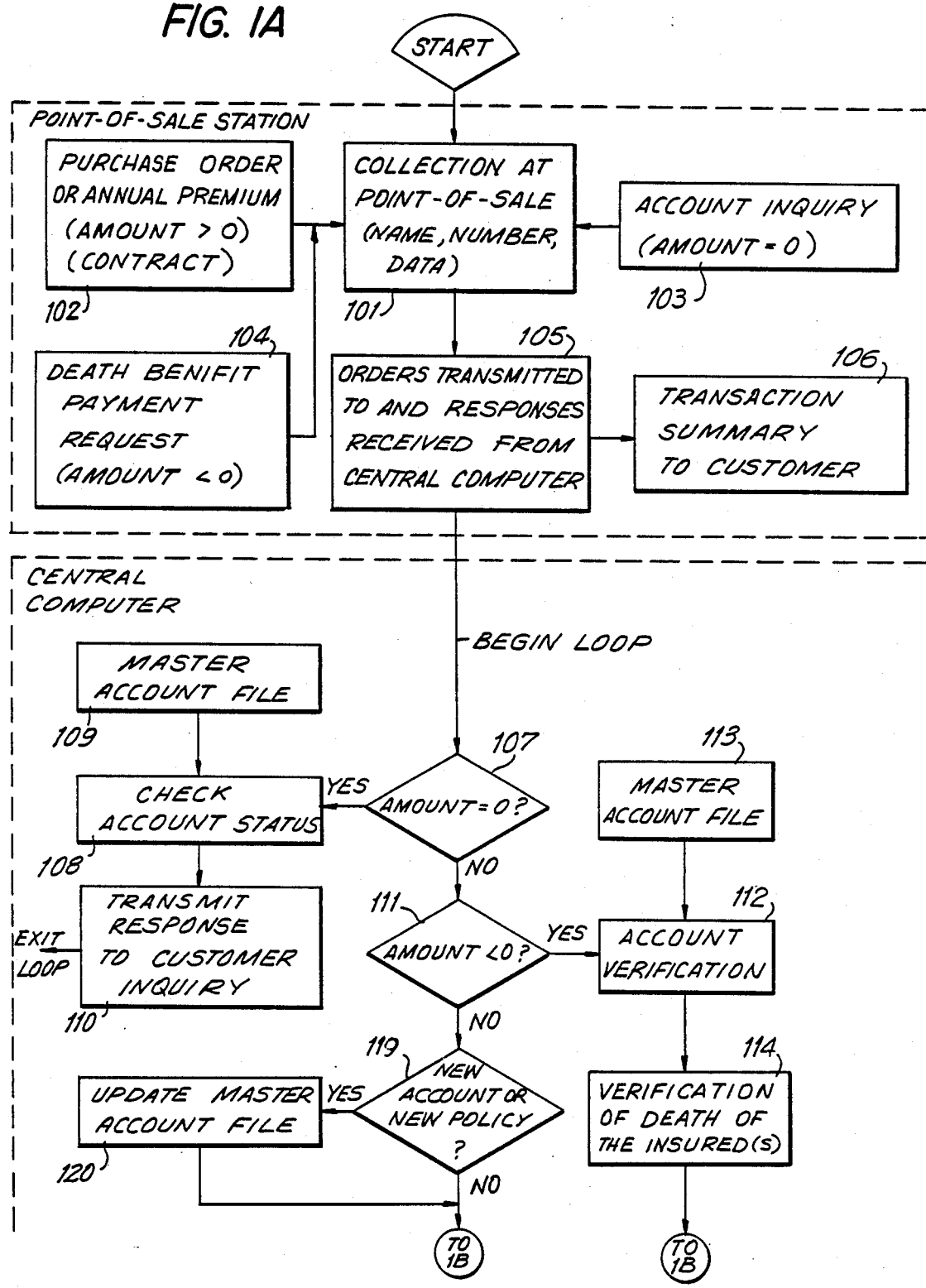

The data processing system for administering the floating rate zero coupon note purchase insurance program comprises a central computer connected to a network of remote point-of-sale stations. In overview, the system operates as follows. The point-of-sale stations serve as the data entry points for insurance unit purchases and payment of periodic (e.g., annual, or any other period may be used) insurance premiums. They also serve as the data entry points for the purpose of notifying the insurer that a death benefit payment is due and providing the insurer the necessary information for verification purposes. The point-of-sale stations also serve as access points through which salespeople can transmit customer inquiries concerning the floating rate zero coupon note purchase insurance program and receive data to respond to those inquiries, determine the annual premium on any floating rate zero coupon note purchase insurance policy the insurer is offering and determine the appropriate charge to the customer for insurance purchases, and determine the amount of any death benefit that becomes payable. In addition, each point-of-sale station stores a record of each customer transaction it handles, and periodically these are transmitted to the central computer for processing.

The central computer receives and processes customer transaction data from the point-of-sale stations, responds to customer inquiries, and initiates annual premium notices and automatic premium loans. The data processing system, which operates on the central computer, updates the list of policy holder accounts, including opening new accounts and closing accounts whose policies all either expire or are paid off on due to the death of the insured. This system also provides confirmations of account status to the relevant point-of-sale station when the insurer is notified that a death benefit payment is due. The central system also furnishes information to the insurance manager concerning new purchases, annual premium payments, and the payment of death benefits. The system also provides the insurance manager with information (1) regarding the performance of the asset portfolio, the projected yield on the asset portfolio, and the projected cost of the insurance liability pool, and (2) comparing the projected cash flow stream from the asset portfolio to the projected insurance liability stream. The data processing system creates a periodic (e.g., daily) report to the insurance manager summarizing customer transactions, investment transactions, asset and liability position, and yield and cost data. It also prepares a regular end-of-period report that summarizes the investment performance of the fund during the period.

With the foregoing overview in mind, the detailed operation of the system can best be understood by referring to FIGS. 1A–7B, which are flow charts of the operation of the system in the context of an insurance program for insuring the purchase of floating rate zero coupon notes for funding in full, i.e., defeasing, the uncertain cost of a future college education. Although the invention is shown and described herein in the context of insuring the funding of future college education costs, it will be apparent to one skilled in the art that the invention could readily be adapted to insuring defeasance programs for funding other future liabilities of uncertain cost, such as the future uncertain cost of purchasing a home, of a stream of future pension benefits, of purchasing one or more pieces of equipment, of purchasing a unit of gold or some other commodity or some service, etc.

As shown in FIGS. 1A–1C, customers interact with the system at point-of-sale stations. These can be located at remote points limited only by the ability of the point-of-sale stations to communicate electronically with the central computer. Orders and customer inquiries are collected at the point-of-sale stations (block 101). First the customer's (NAME) and account number (NUMBER) are entered. If the customer does not have an account, data are entered indicating that a new account is to be opened. Then an order or inquiry (referred to generically at block 101 as DATA) is entered. A customer may submit a purchase order for an insurance policy, make a regular premium payment (block 102), or inquire as to the status of his or her account (block 103). Someone authorized to act on behalf of the estate of the insured or on behalf of the beneficiary may notify the insurer that a death benefit payment is due (block 104). Transaction requests include the identification of the insurance policy to be purchased or on which an insurance premium or death benefit is to be paid and, in the case of a purchase or premium payment, the amount of the transaction (referred to generically at block 102 as CONTRACT). Inquiries specify the particular information items requested. These orders and inquiries are transmitted to the central computer, and information regarding transactions, insurance premiums, and account status are received back from the central computer and displayed on a CRT terminal (block 105). Alternatively, purchase orders, annual premium payments, and requests for death benefit payments could be stored at block 105 and transmitted periodically (e.g., at the end of each day) to the central computer for processing. FIG. 2 depicts in more detail the point-of-sale station to central computer interface. At the conclusion of each transaction, a customer can request a printed confirmation record of the transaction (block 106).

Each customer request is processed individually in a loop that begins with test 107 and ends at block 130. The incoming request is first subjected to test 107. If the dollar amount of the transaction (AMOUNT) is equal to zero, the request is an inquiry, which is referred to blocks 108–110 for processing. The status of the account is checked at block 108. Information the policy holder requested is retrieved from the master account file at block 109 and the response is transmitted to the policy holder at block 110. The requested information is displayed on the CRT terminal. Table 1 illustrates the type of information a policy holder might request and how that information might be formatted. The response to each inquiry lists the policy holder's name and account number and the number (or numbers) of the policy (or policies) held in the account and then provides the information requested—in this case, the nature and number of floating rate zero coupon notes insured under each policy.

TABLE 1

| | |
|---|---|
| Name: | John Q. Holder |
| Account Number: | 001-000000001 |
| Policy Number: | 001-000000001-1 |
| Floating Rate Zero Coupon Note Maturing: | 8/15/2001 |
| Fraction of Note Insured: | 1.0 |
| Policy Number: | 001-000000001-2 |
| Floating Rate Zero Coupon Note Maturing: | 8/15/2002 |
| Fraction of Note Insured: | 0.5 |

Figure 3:
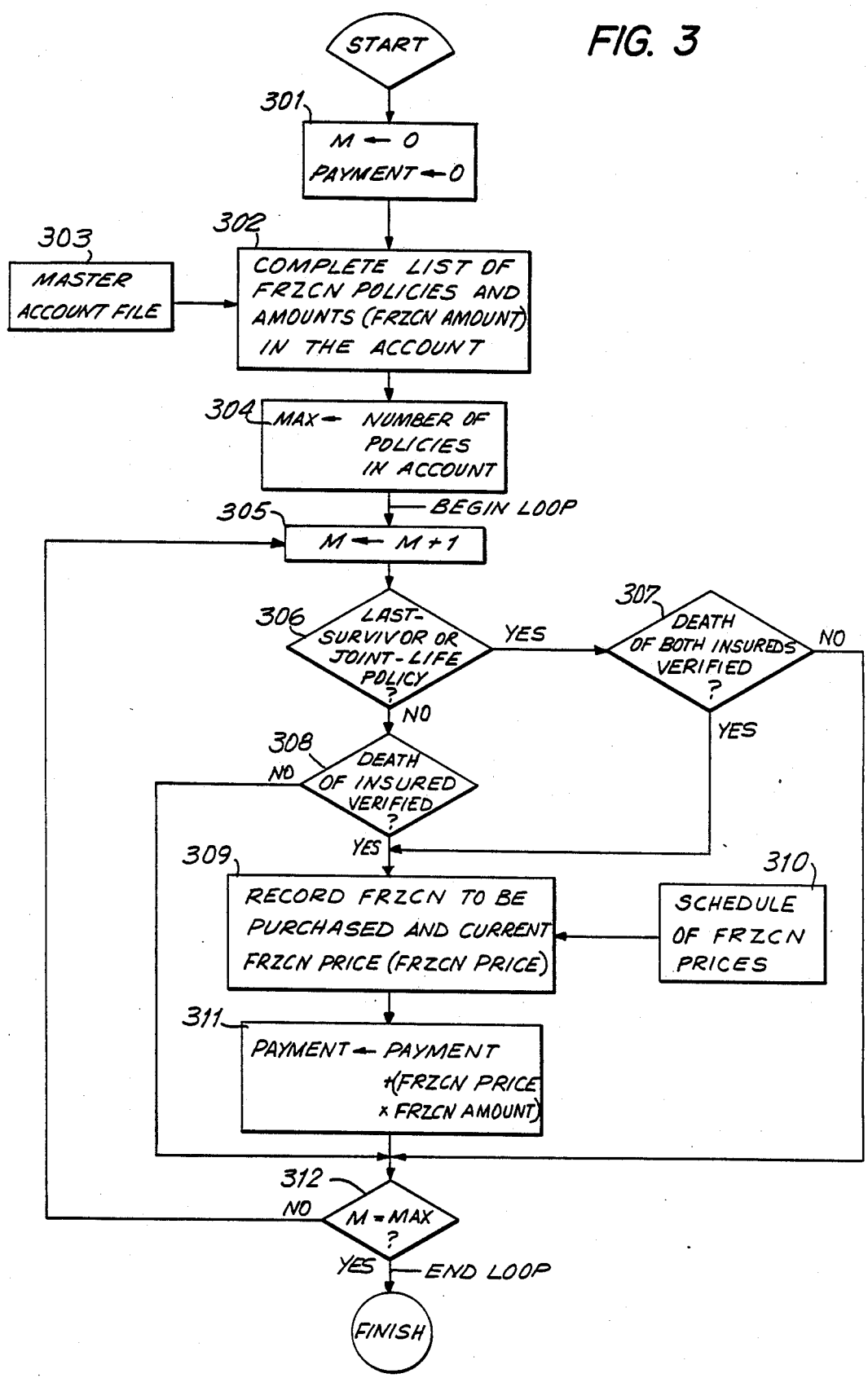
FIG. 3 is a flow chart depicting in more detail the method and apparatus for calculating the amount of the death benefit payments to be made to the designated beneficiary accounts upon the death of the insured represented by block 115 in FIG. 1A.

If AMOUNT is not equal to 0, the customer request passes to test 111. If AMOUNT is less than 0, the request is a death benefit payment notification, and the system flow passes to block 112. At block 112 the account information is verified by checking the master account file at block 113 to make sure that the account is valid, that it contains the policy on which payment is demanded, and that the insurance policy was in force on the date of death of the insured. When the account information has been verified, data flow passes to block 114 where the system checks that the death of the insured has been verified. Such verification requires that the person requesting payment provide a valid death certificate, in the case of single-life coverage, or two valid death certificates, in the case of either joint-life coverage or last-survivor coverage, and that the insurer verify the validity of the death certificates and enter data into the system confirming the verification. For example, a clerk may telephone both the signer of the death certificate and the place where it was recorded to be sure it is authentic. The names and addresses of the sources contacted are then entered for each verified certificate. If death is verified control then passes to block 115 where the death benefit payment (PAYMENT) is calculated. FIG. 3 describes in greater detail the calculation of the death benefit, which involves identifying the floating rate zero coupon note or notes contracted to be purchased, the fraction or number of each such note or notes, and the price of each floating rate zero coupon note, which is obtained from the floating rate zero coupon note price list at block 116. System flow then moves to block 117 for payment of the death benefit. The total death benefit payment will be distributed among one or more designated beneficiary accounts as specified by the policy holder and recorded in the master account file at block 118. Control then passes to block 131.

If instead AMOUNT is greater than 0, the request is either a purchase request or the payment of the annual premium or some portion thereof on a policy that was previously purchased. In this case, control passes from test 111 to test 119, which determines whether the request pertains to a new account or to a new insurance policy. If so, a new account is opened or an existing account record is updated for the new policy, whichever is appropriate, at block 120. Otherwise control passes to block 121 where the amount of the annual premium owed is retrieved from either the master account file at block 122, in the case of an existing policy, or the schedule of annual premiums at block 123, in the case of a new policy. Control then passes to test 124 where the system determines whether the policy holder has requested an automatic premium loan on the underlying floating rate zero coupon note to pay the premium on the insurance policy. If so, control passes to block 125 where the system verifies that the floating rate zero coupon note account is valid by checking the master account file at block 126. Control then passes to test 127 where the system determines whether the floating rate zero coupon note account contains sufficient accrued interest to pay the outstanding balance of the annual premium in full. If not, control passes to block 128 where the system draws a premium loan equal in amount to all the accrued interest in the floating rate zero coupon note account. Control then passes to block 130. If there is adequate accrued interest in the account to cover the balance of the premium owed, control moves to block 129 where the system draws a loan just large enough to cover the balance owed, which equals the amount of the premium (ANNUAL PREMIUM) minus the total of cash payments previously made toward that particular premium (CASH PAYMENTS). Control then passes to block 130.

If an automatic premium loan has not been requested, system flow moves directly to block 130. At block 130, transaction data for new policy purchases, premium payments, and death benefit payments are checked for possible errors in calculation. From verification block 130, system flow moves to block 131 where each transaction is recorded in the system's master account file and master transaction file. Thereafter, system flow passes to block 132, where the floating rate zero coupon note insurance schedule is updated to reflect purchases and death benefit payments.

Figure 4A:
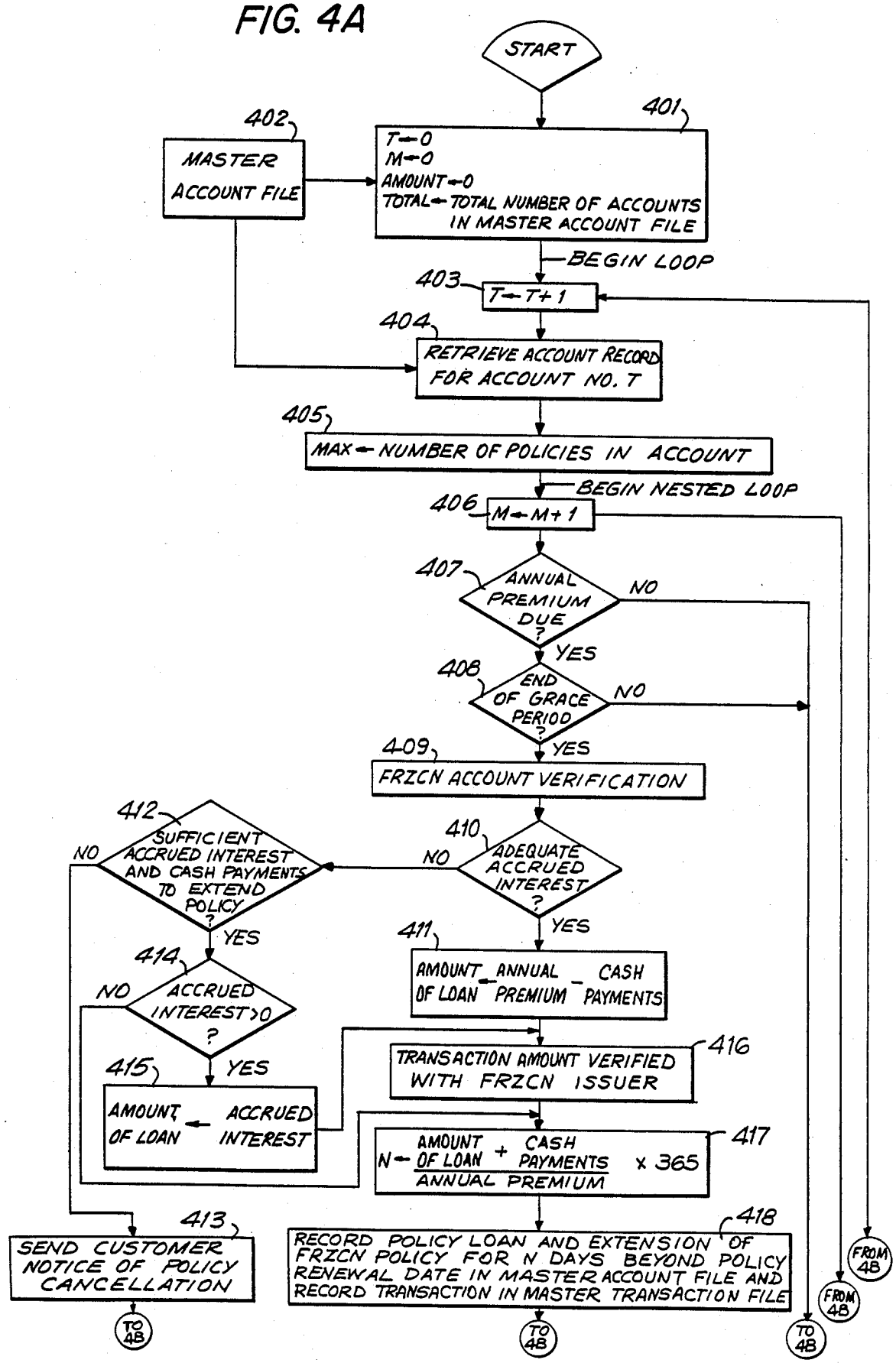
FIGS. 4A–4B are a flow chart depicting in more detail the method and apparatus for drawing automatic premium loans to make a premium payment at the end of the premium payment grace period represented by block 134 in FIG. 1B.
Figure 4B:
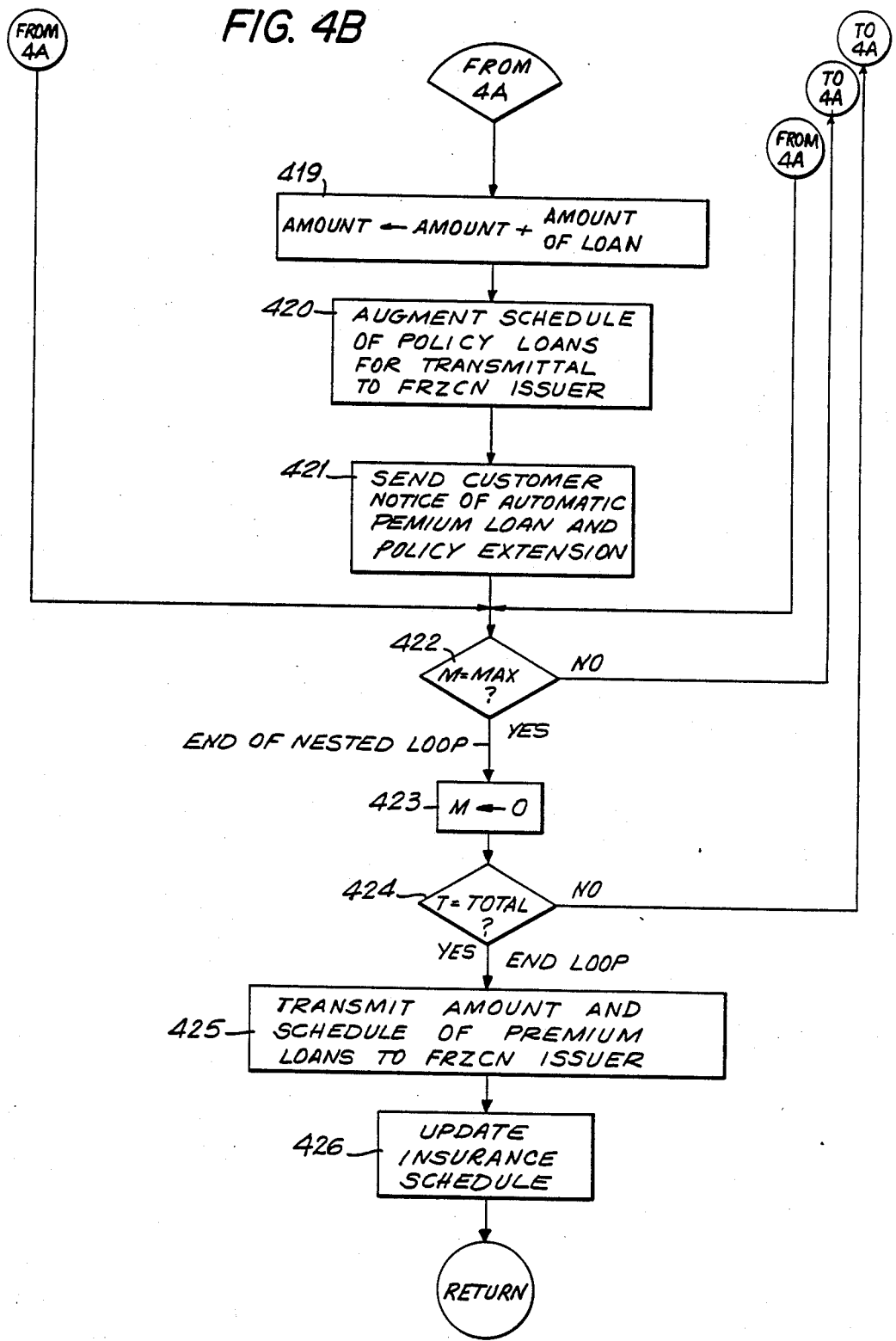

Next, system flow passes to test 133, which determines whether or not all the transactions for the particular day in question have been processed. If not, system flow passes back to the beginning of the loop at test 107 to receive the next customer request. If it is the end of the day and all transactions for the day have been processed, control moves to block 134, which draws automatic premium loans to pay the premiums on all insurance policies for which the premium payment grace period is scheduled to expire at the end of that particular day. FIGS. 4A-4B describe in greater detail how the system draws automatic premium loans on the last day of each policy's grace period when an outstanding balance owed remains. This process involves drawing up to all the accrued interest in the underlying floating rate zero coupon note accounts to pay the premium. If the amount of accrued interest is insufficient, the system draws all the available accrued interest and pays for whatever fraction of the annual premium the accrued interest will cover. The policy is extended for a like fraction of the year from the renewal date. The system is easily adaptable by one skilled in the art so as to tie the automatic premium loan provision to one or more but fewer than all the floating rate zero coupon note accounts underlying a particular insurance policy, or instead to other floating rate zero coupon note accounts.

Figure 5A:
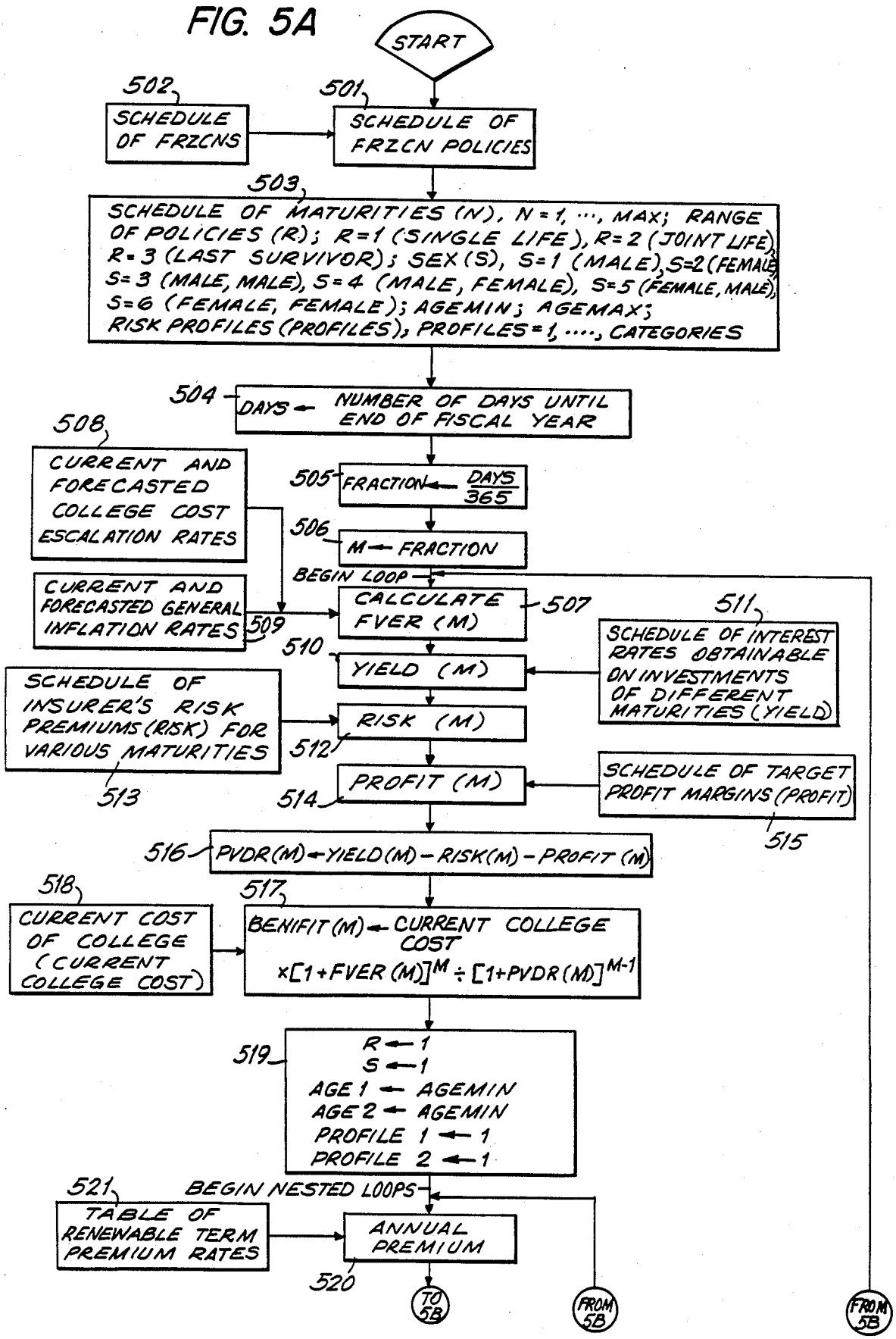
Figure 5B:
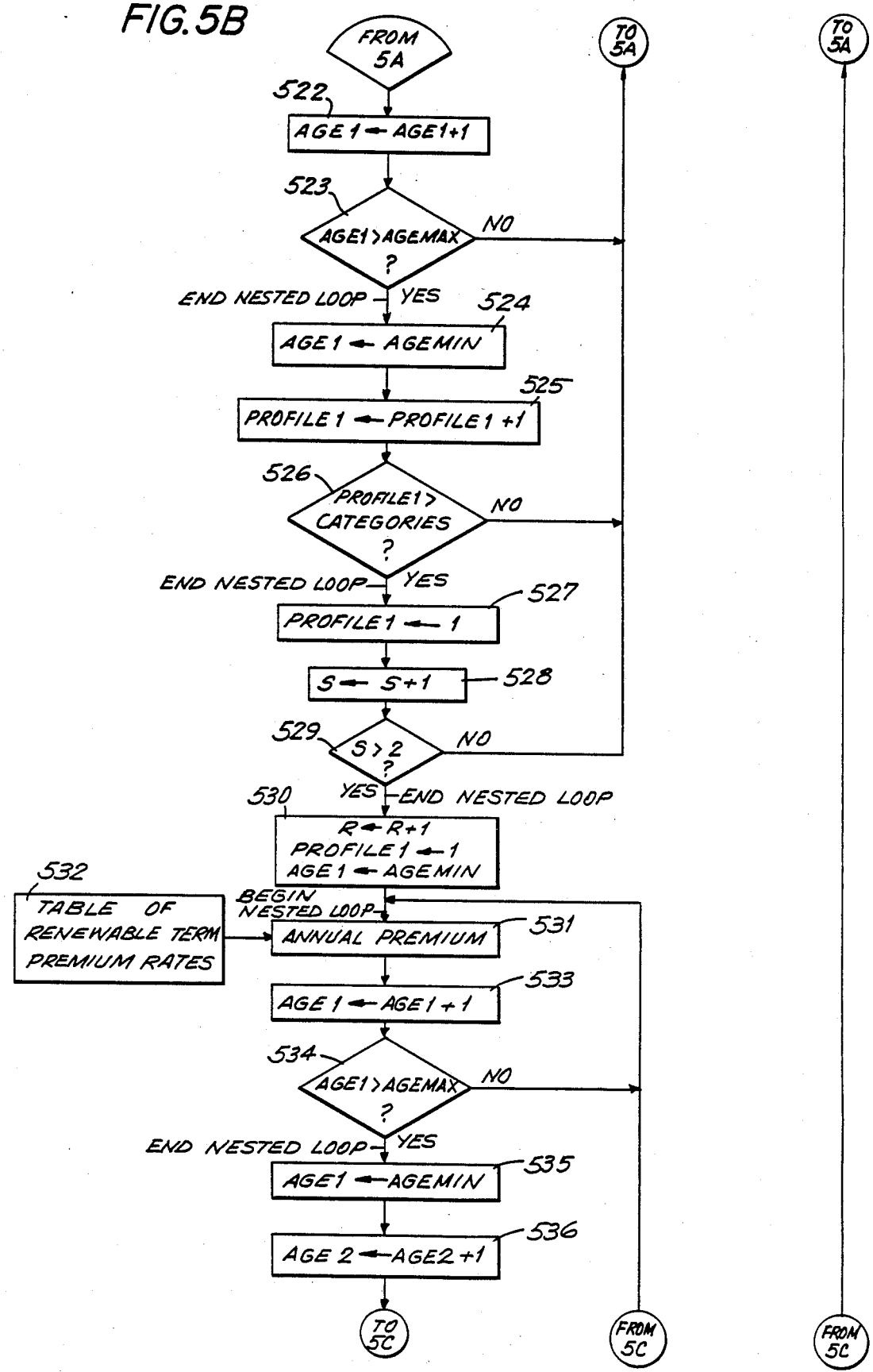

Next, system control proceeds to block 135, which prepares the next day's schedule of insurance premiums. Alternatively, in certain applications, it may be necessary to update the insurance premium list with greater frequency. FIGS. 5A-5C describe the process used for updating the schedule of floating rate zero coupon note insurance premiums, which is based on the current and expected escalation rates in the cost of college, the current and expected general inflation rates, interest rates available on investments to fund the floating rate zero coupon note insurance liabilities, the maturity of the floating rate zero coupon note underlying the policy, the insurer's risk premium required to compensate the insurer for the college cost escalation risk assumed by the insurer, the insurer's desired profit margin, the age of the insured, the type of insurance policy, the sex of the insured, and the risk profile of the insured. The updated schedule of annual insurance premiums is transmitted to the point-of-sale stations. There the schedule is used by the salespeople to provide premium information to customers.

Figure 6A:
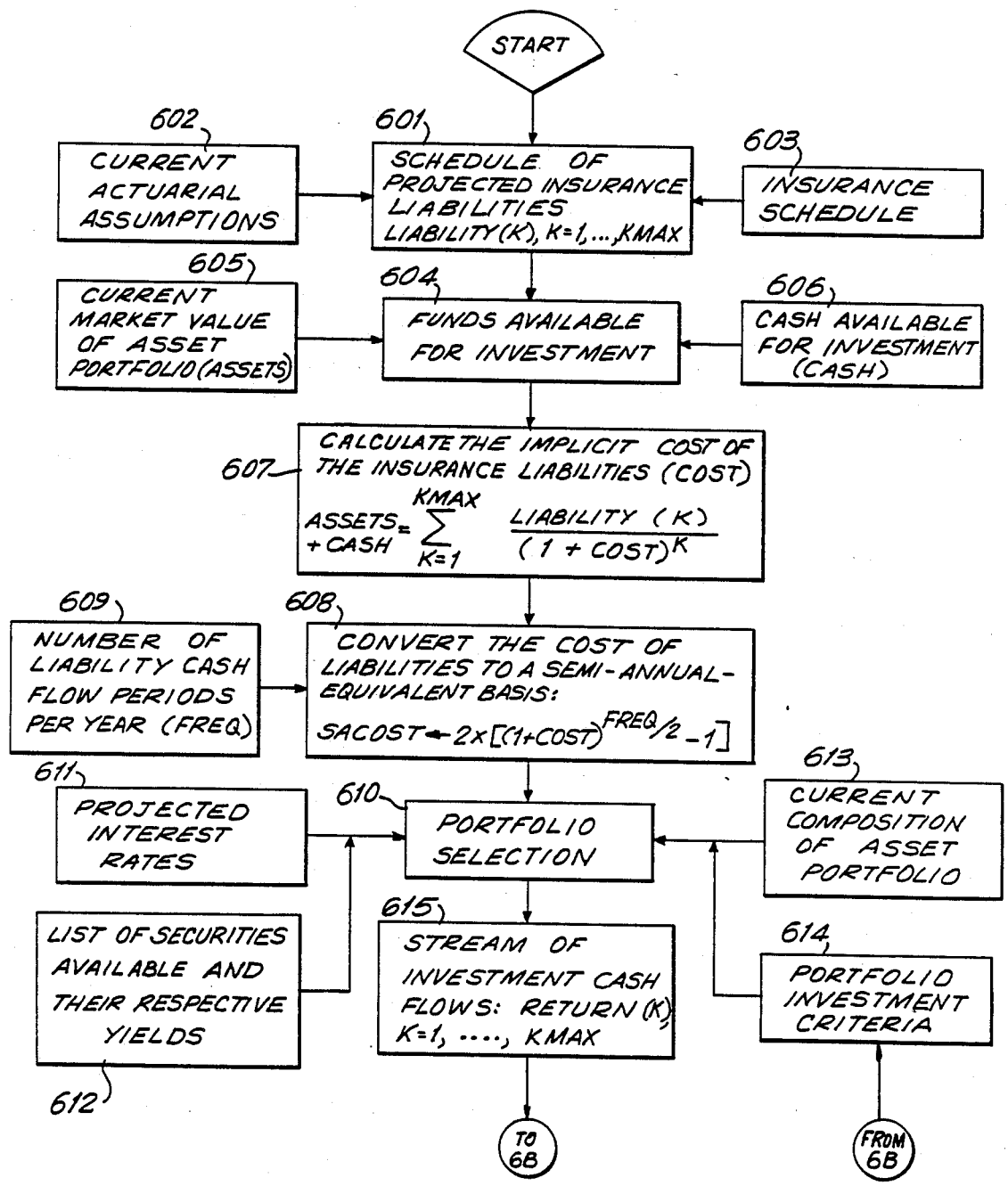
FIGS. 6A–6B are a flow chart depicting in more detail the asset portfolio update operation represented by block 136 in FIG. 1B.
Figure 6B:
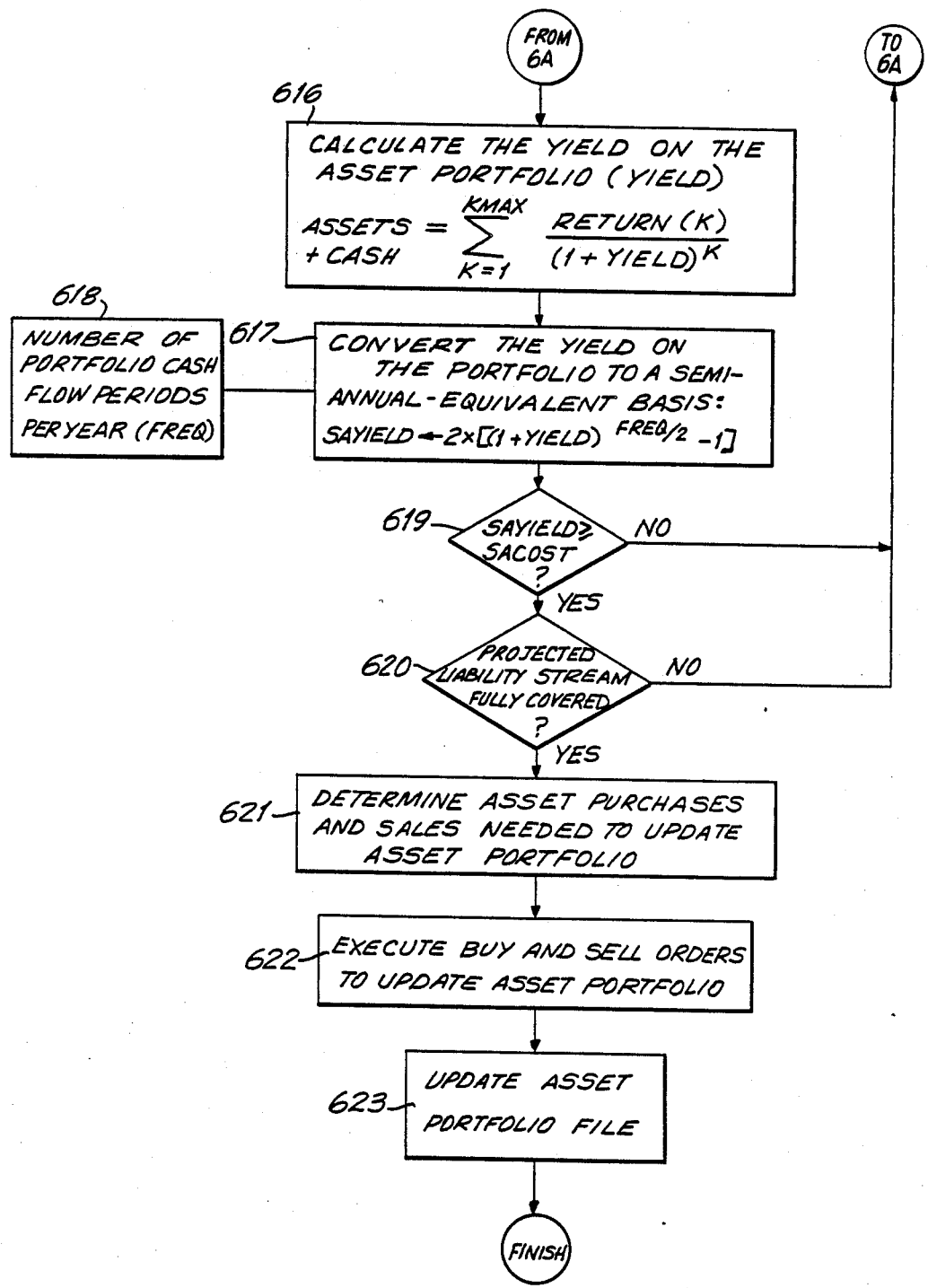

System flow then passes to block 136, which carries out the update asset portfolio operation to determine the updated investment portfolio based on current and projected customer transactions, the aggregate schedule of insurance policies in force, the amount of cash available for investment, projected interest rates, the current composition of the asset portfolio, and the portfolio investment criteria supplied by the fund manager. FIGS. 6A-6B describe the update asset portfolio operation in greater detail. The data processing system advises the insurance manager of its determination concerning the net amount of required investment transactions and provides a list of suitable investment alternatives and their respective yields. Based on this information, the insurance manager can choose the investment transactions to be made and enter the investment transaction data into the system.

After the investment transaction data are entered, system flow passes to block 137 where a periodic (e.g., daily) transaction report is prepared for the insurance manager. This report summarizes the transactions that took place during the day; provides the end-of-day asset and insurance liability position; furnishes the investment yield and the projected composite cost of the insurance liabilities, both on a semi-annual equivalent-yield basis; and indicates the projected income flows from the updated asset portfolio and the projected stream of insurance liabilities.

Next, at test 138 the system determines whether the day in question is the last day of the policy holder reporting period for any group of policy holders. If not, system flow passes to block 140. Otherwise system flow passes to block 139 where the premium notices and end-of-period reports to policy holders are prepared and sent.

Figure 7A:
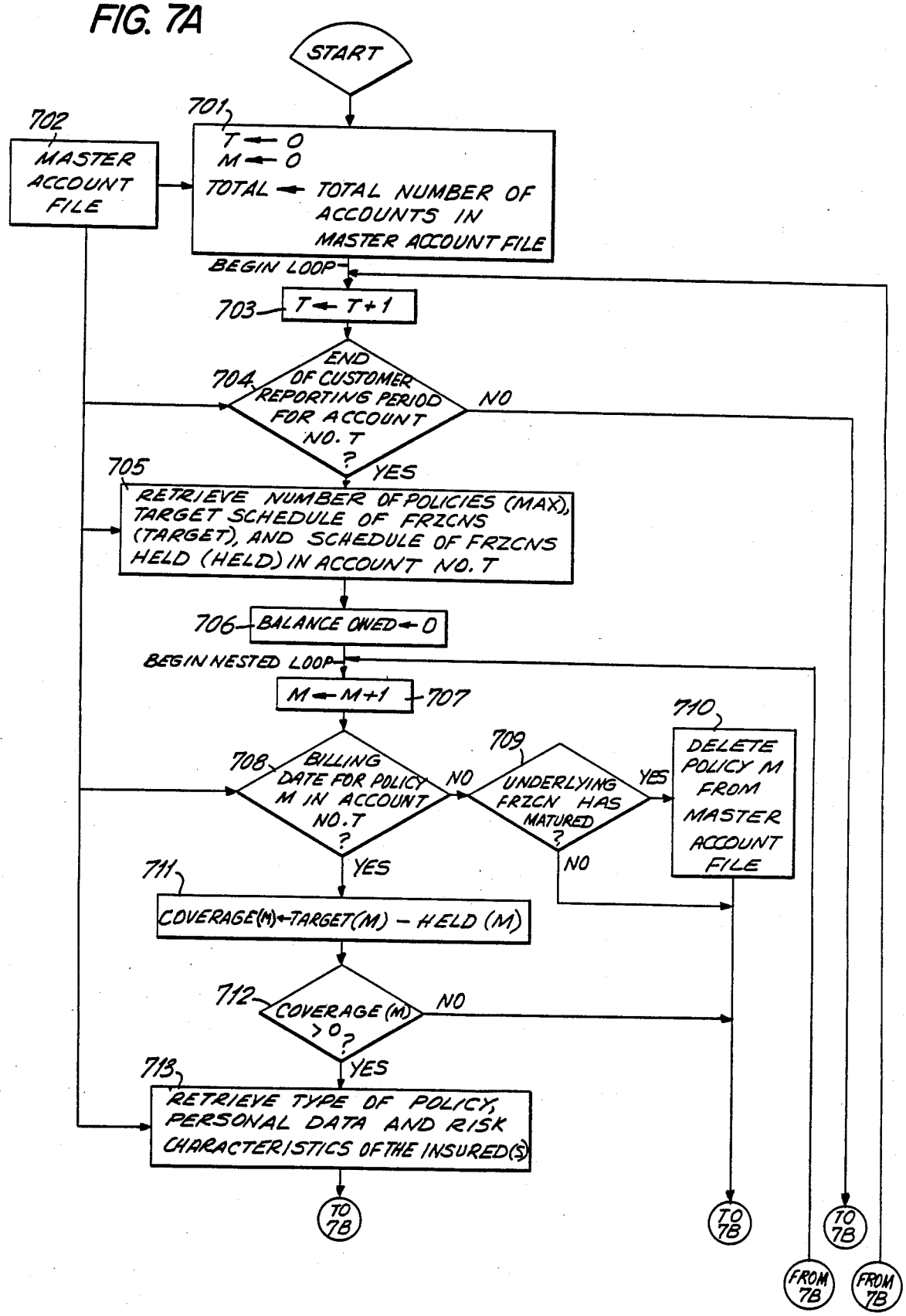
FIGS. 7A–7B are a flow chart depicting in more detail the method and apparatus for billing customers for payment of premiums and for reporting to policy holders represented by block 139 in FIG. 1C.
Figure 7B:
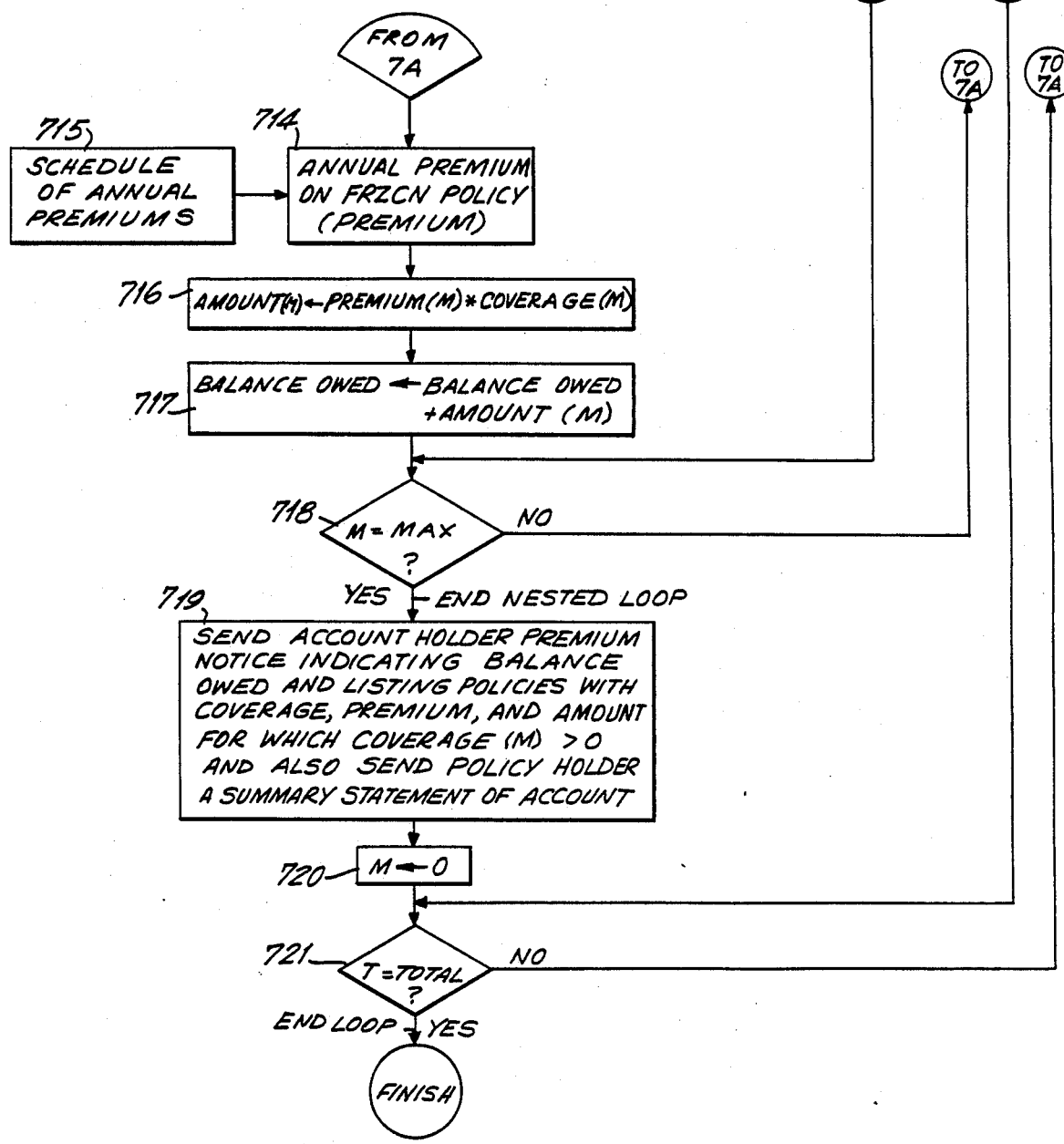

FIGS. 7A-7B describe the individual policy holder record-keeping, premium billing, and reporting system in greater detail. The system automatically deletes from the master account file any floating rate zero coupon note purchase insurance policy for which the underlying floating rate zero coupon note has matured. The system also automatically reduces the number of floating rate zero coupon notes of any particular maturity that are covered by insurance to reflect any purchases of floating rate zero coupon notes of that particular maturity and automatically increases the number of floating rate zero coupon notes of any particular maturity that are covered by insurance in order to reflect any increase in the policy holder's desired floating rate zero coupon note insurance coverage.

System flow then moves to test 140 where the system determines whether or not the day in question is the last day of the financial reporting period. If not, system flow passes to block 144. Otherwise, the system prepares the end-of-period investment performance and position report for the insurance manager at block 141. This report provides various measures of investment performance which the insurance manager can use to monitor the profitability of the investment program adopted during the period. Next, system flow passes to block 142 where the system prepares end-of-period financial statements drawing on information that has been recorded in the accounting files at block 143 during the period. System flow then proceeds to block 144 where at the end of each day the daily transaction summary and summary of current position are transmitted to the insurance manager and at the end of each period the investment performance and position report and the end-of-period financial statements are transmitted to the insurance manager.

Referring now to FIG. 2, there is shown a more detailed flow chart depicting the point-of-sale station to central computer interface corresponding to block 105 in FIG. 1A. Information is collected at the point-of-sale stations and transmitted to the central computer, and information is received back from the central computer. The process diagrammed in FIG. 2 involves the transmission of information from the point-of-sale stations to the central computer.

The process starts at block 201 where a salesperson, or customer representative, who is serving a customer at a point-of-sale station logs on to the system. This transmits a signal to the central computer indicating that a customer purchase order or installment payment, death benefit payment request, or inquiry is about to be received at the point-of-sale station. The central computer prompts the point-of-sale station at test 202 for entry of an amount (AMOUNT) by asking whether the customer has an inquiry, which is signified by AMOUNT=0, or whether the customer wishes to effect a transaction, which is signified by AMOUNT not equal to 0.

If AMOUNT=0, the central computer prompts the point-of-sale station at block 203 for the account holder's name (NAME) and account number (NUMBER) and at block 204 for the items of information requested, such as the current schedule of insurance premiums or the status of the account. This information is transmitted to the central computer at block 214 for processing.

If AMOUNT is not equal to 0, then a payment for insurance or a death benefit payment will take place. System flow passes to test 205 where AMOUNT is tested in order to determine the nature of the transaction. If AMOUNT is less than 0, the transaction involves a death benefit payment. The central computer prompts the point-of-sale station at block 206 to record the account holder's name (NAME) and account number (NUMBER) and at block 207 to record data indicating the means of verifying the death of the insured. In the case of single-life policy, this verification process involves the furnishing of a certified death certificate for the insured. In the case of joint-life or last-survivor policies, in each case the verification process involves the furnishing of a certified death certificate for each of the two insureds. The customer representative verifies the authenticity of each death certificate and then enters at the point-of-sale station the names and addresses of the sources contacted to verify the authenticity of each death certificate. This information together with the account holder's name and the account number are transmitted to the central computer at block 214 for processing.

If AMOUNT is greater than 0, the transaction involves either the purchase of a new insurance policy or full or partial payment of the annual premium on an existing policy. Test 208 determines whether or not a new account needs to be opened. If so, the central computer prompts the point-of-sale station at block 209 to record the person's name and address and certain personal data, such as tax identification number, required to open a new account. Control then passes to block 212.

Otherwise, system flow passes to block 210, where the central computer prompts the point-of-sale station to record the account holder's name (NAME) and account number (NUMBER), and then to test 211 where the system tests whether the transaction involves a full or partial premium payment on an existing policy. If so, control passes to block 213 where the amount of the premium paid and the policy number are recorded. Otherwise, the transaction involves the purchase of a new insurance policy, and control passes to block 212.

At block 212 the central computer prompts the point-of-sale station to record for each new policy the type of policy desired (e.g., single-life coverage, joint-life coverage or last-survivor coverage); the amount of coverage desired (i.e., the floating rate zero coupon note to be covered along with the fraction (possibly less than, equal to, or greater than 1) of such floating rate zero coupon note to be covered); the purchaser's target fraction of the floating rate zero coupon note specified in the policy (i.e., the fraction (possibly less than, equal to, or greater than 1) of the floating rate zero coupon note that the insurance purchaser would like the policy beneficiary either to own or to have covered by insurance); the payment plan selected; the name, address, age, and other required personal data for each of the insureds; and the designated beneficiary accounts into which the death benefit payable upon the death of the insureds is to be paid along with instructions as to how the death benefit payment is to be allocated among these accounts. The routine in FIG. 2 assumes that each floating rate zero coupon note purchase insurance policy pertains to a single floating rate zero coupon note. One skilled in the art would readily adapt the routine so as to tie a floating rate zero coupon note purchase insurance policy to two or more different floating rate zero coupon notes.

System flow then passes to block 213 where the central computer prompts the point-of-sale station to record the amount of the premium paid and the policy number. This information, along with the new account information if the transaction involved a new account, and also along with the new policy information if the transaction involved a new policy, are transmitted to the central computer at block 214. At this point the input operation has been completed and control is transferred to block 107 in FIG. 1A where the central computer begins the processing operation.

Referring now to FIG. 3, there is shown a more detailed flow chart depicting the calculation of the amount of the death benefit payment (PAYMENT) to be made to the designated beneficiary accounts upon the death of the insured, in the case of a single-life policy, and upon the death of the two insureds, in the case of either a joint-life policy or a last-survivor policy at block 115 in FIG. 1A. The process begins at block 301 where the system initializes to zero the variables M and PAYMENT. The variable M is a policy number counter, and the variable PAYMENT will contain the amount of the death benefit payment at the end of the loop.

System flow then passes to block 302 where the system compiles a list of the floating rate zero coupon note purchase insurance policies and the amount of floating rate zero coupon note purchase insurance specified in each policy in the account. The system obtains this information from the master account file at block 303. Control then passes to block 304 where the variable MAX is set equal to the number of floating rate zero coupon note purchase insurance policies on the list that was compiled at block 302.

A loop begins next at block 305 where the counter M is incremented by one. The loop examines the policies in the account one-by-one in order to determine those on which a death benefit payment is due. Control next moves to test 306 where the system tests whether policy number M is either a last-survivor policy or a joint-life policy. If so, control passes to block 307 where the system determines whether the deaths of both insureds have been verified. If so, control passes to block 309 for the calculation of the death benefit payable under the policy. If the deaths of both insureds have not been verified, no death benefit is payable, and control passes to test 312 to determine whether the loop has been completed. If the policy is neither a last-survivor policy nor a joint-life policy, then the policy is a single-life policy, and control passes from test 306 to test 308. At test 308 the system tests whether the death of the insured has been verified. If not, no death benefit is payable, and control passes to test 312. Otherwise, the death has been verified, and system flow passes to block 309 for calculation of the death benefit payable under the policy.

At block 309 the system records the type of floating rate zero coupon note that is to be purchased as the death benefit. The system checks the schedule of floating rate zero coupon note prices at block 310 to determine the current price of the floating rate zero coupon note. Control then passes to block 311 where the system calculates the amount of the payment. For each separate floating rate zero coupon note payable as a death benefit, the system multiplies the current price of the floating rate zero coupon note by the fraction of the floating rate zero coupon note specified in the insurance policy. At each iteration of the loop, the list of floating rate zero coupon notes to be purchased is augmented at block 309 and the value of each additional (fractional) floating rate zero coupon note is added to the value of the death benefit payable (PAYMENT) under the floating rate zero coupon note purchase insurance policies in the account under consideration at block 311.

System flow then moves to test 312 to determine whether all the policies in the account have been reviewed for potential death benefit payments. If M=MAX, then all the policies have been reviewed and the loop ends. Otherwise, control is returned to block 305 to increment the counter M by 1 and consider the next policy in the account. At this point the death benefit payment calculation operation has been completed and control is transferred to block 117 in FIG. 1A for payment of the death benefit.

Referring now to FIGS. 4A-4B, there is shown a more detailed flow chart depicting the drawing of automatic premium loans to make a premium payment at the end of the premium payment grace period represented by block 134 in FIG. 1B. Many life insurance policies contain an automatic premium loan provision, which automatically borrows against the cash value of the policy to pay the scheduled premium at the end of the premium grace period. The data processing routine embodied in FIGS. 1A-1C contains a similar provision at block 134. The routine diagrammed in FIGS. 4A-4B differs from the customary automatic premium loan provision in that the floating rate zero coupon note purchase insurance does not build up a cash value so that the loan cannot be taken against the policy. Instead, the loan is taken against the accrued interest on the underlying floating rate zero coupon notes.

One skilled in the art will appreciate that if a floating rate zero coupon note purchase insurance policy did not contain an automatic premium loan provision that triggered a premium loan at the end of the grace period, the data processing routine embodied in FIGS. 1A-1C could be adapted to such a policy simply by bypassing block 134 in FIG. IB.

The automatic premium loan provision detailed in FIGS. 4A-4B draws up to all the accrued interest in the floating rate zero coupon note accounts into which the floating rate zero coupon note death benefit payments would be made in order to pay any overdue premiums on the last day of each respective premium grace period. If the amount of accrued interest is insufficient, the system draws available accrued interest and pays for whatever fraction of the annual premium the accrued interest will cover. The policy is extended for a like fraction of the year from the renewal date. The system is adaptable by one skilled in the art so as to tie the automatic premium loan provision to one or more but fewer than all the floating rate zero coupon note accounts underlying a particular insurance policy, or instead to other floating rate zero coupon note accounts.

The premium loan process begins at block 401 where the system initializes the variables T, M, and AMOUNT to 0 and the variable TOTAL to the total number of accounts in the master account file. The variables T and M are account number and policy number counters, respectively, and the variable AMOUNT will equal the total amount of automatic premium loans for the day for all floating rate zero coupon note purchase insurance accounts when the routine is completed. The value of TOTAL is obtained from the master account file at block 402. System control then passes to block 403 where the account number counter T is incremented by 1 and the loop, which will examine the accounts one-by-one, begins.

System flow then passes to block 404 where the system retrieves the account record for account number T from the master account file at block 402. Next, at block 405 the system sets the value of the variable MAX equal to the number of policies in account number T. System flow then passes to block 406 where the policy number counter M is incremented by 1 and a nested loop, which will examine each policy in account number T one-by-one, begins. Next at test 407 the system determines whether there is a premium due on policy number M in account number T. If not system flow passes to test 422. Otherwise the annual premium is due, and system control moves to test 408 where it is determined whether it is the end of the grace period for the premium in question. If not, system flow passes to test 422. Otherwise it is the last day of the grace period, and system flow passes to block 409 where the system begins the process of drawing the automatic premium loan.

The floating rate zero coupon note accounts into which the death benefits of policy M would be paid and from which accrued interest to pay the premium will be drawn are verified at block 409. Control then passes to block 410 where the system tests whether or not there is adequate accrued interest in the floating rate zero coupon note accounts to pay the entire balance owing on the annual premium on policy M. If so, control flows to block 411 where the amount of the premium loan (AMOUNT OF LOAN) to be drawn is set equal to the annual premium (ANNUAL PREMIUM) less all cash payments previously made toward that premium (CASH PAYMENTS). Control then moves to block 416. Otherwise control passes to test 412.

At test 412 the system determines whether or not there is sufficient accrued interest plus prior cash payments available to pay a large enough portion of the premium to extend the policy beyond the premium grace period. If not, control passes to block 413 where the customer is sent a notice of policy cancellation. After block 413, control passes to test 422 to determine whether or not to continue the nested loop.

If there is sufficient accrued interest plus prior cash payment, the policy can be extended. Control passes to test 414 to determine whether or not there is any accrued interest available to pay a portion of the premium. If not control passes to block 417. If there is accrued interest available, flow passes to block 415 where the amount of the premium loan to be drawn is set equal to the entire amount of accrued interest in the floating rate zero coupon note accounts. Control then passes to block 416 where the system verifies the premium loan amounts with the issuer of the floating rate zero coupon notes. Control then passes to block 417.

At block 417 the system calculates the length of the period over which insurance policy M can be extended based on the cash payments, if any, and the amount of the automatic premium loan, if any, available for that purpose. The term of the insurance policy is extended for a fraction of the year beyond the scheduled renewal date, the numerator of which fraction is the amount of cash available from cash payments and policy loans to pay at least a portion of the premium and the denominator of which is the amount of the annual premium.

Next, control passes to block 418 where the system records the policy loan and the extension of the term of the floating rate zero coupon note purchase insurance for a period N days beyond the policy renewal date in the master account file and records the premium payment in the master transaction file. Control then moves to block 419 where the system updates the aggregate amount of automatic premium loans for the day in question (AMOUNT). System flow next passes to block 420 where the schedule of automatic policy loans is augmented. This schedule will be transmitted to the issuer of the floating rate zero coupon notes at block 424 after the loop has been completed. Then control passes to block 421 where the system sends the customer a notice of automatic premium loan and policy extension. This completes the processing of floating rate zero coupon note policy number M in account number T.

Next, system flow moves to test 422 to determine whether all the insurance policies in account number T (MAX in total) have been reviewed. If so, the nested loop ends, and control passes to block 423, where the variable M is reinitialized to 1, and then to test 424. Otherwise control returns to block 406 to begin review of the next policy in account number T. At test 424 the system determines whether all the accounts (TOTAL in all) have been reviewed. If so, the loop ends, and control passes to block 425. Otherwise control returns to block 403 to begin review of the next account.

At block 425 the system transmits the aggregate amount of automatic premium loans for the day in question (AMOUNT) and the itemized schedule of automatic premium loans to the issuer of the floating rate zero coupon notes. Control then passes to block 426 where the system updates the schedule of floating rate zero coupon note purchase insurance in force to reflect the automatic premium loans just described. That operation completes the process of drawing automatic premium loans, and control passes to block 135 in FIG. 1B.

Referring now to FIGS. 5A–5C, there is shown a more detailed flow chart depicting the determination of the schedule of annual premiums to be charged for floating rate zero coupon note purchase insurance represented by block 135 in FIG. 1B. The annual premium to be charged for each insurance policy depends on the type of policy, the sex of the insured, the age of the insured, the risk profile of the insured, and the projected death benefit payment. The data processing routine in FIGS. 5A–5C assumes that three types of insurance policies are offered: single-life coverage, joint-life coverage, and last-survivor coverage. One skilled in the art could adapt the routine to accommodate other types of insurance policies, including policies other than life insurance policies (e.g., permanent disability insurance). The projected death benefit payment is calculated as the projected price of the floating rate zero coupon note at the end of the policy's one-year term, which depends on the current and forecasted rates of escalation in the cost of the service or commodity to which the interest rate on the floating rate zero coupon notes is tied, current and forecasted general inflation rates, the current and projected yields obtainable on the investment of the proceeds from the sale of floating rate zero coupon notes and reinvestment of interim cash flow, the risk premium and profit margin the issuer of the floating rate zero coupon notes requires for taking on the risk of escalation in the cost of the service or commodity in question, and the maturity of the floating rate zero coupon note. The data processing routine in FIGS. 5A–5C assumes that the insurance policy has a one-year term and that the service or commodity in question is a year of undergraduate college education. One skilled in the art could easily adapt the routine to any other term and to any other service or commodity.

The process begins at block 501 where the system prepares a schedule of floating rate zero coupon note purchase insurance basic policy types based on the schedule of floating rate zero coupon notes at block 502. In its simplest embodiment, the routine could establish one basic insurance policy type corresponding to each floating rate zero coupon note being offered but instead the insurer might decide to offer only a subset of these basic insurance policy types. For example, if there are two types of floating rate zero coupon notes being offered and each is offered in maturities of between 1 and 20 years, there would be 40 basic insurance policy types if the insurer decides to offer a policy corresponding to each available floating rate zero coupon note.

Next control passes to block 503 where the system records the range of floating rate zero coupon note maturities, N=1, ..., MAX, each measured in years from the next succeeding fiscal year-end, where MAX denotes the longest maturity available on any floating rate zero coupon note on which insurance is to be offered; the range of policies (e.g., single-life, joint-life or last-survivor); the sex of the insured; the minimum and maximum ages of the insured for purposes of calculating the insurance premiums; and the risk profile of the insured. Because there may be one or two insureds, there are a total of six possible sex combinations to be considered. The risk profiles will be defined in accordance with customary insurance practice, and will consist of a total of CATEGORIES different risk profiles.

Control then passes to block 504 where the system records the number of days until the end of the fiscal year (DAYS). Next at block 505 the system calculates the fraction of the year remaining (FRACTION) by dividing DAYS by 365. Then at block 506 the variable M is initialized to FRACTION. System control then passes to block 507 to begin a loop that calculates the annual insurance premiums for the entire range of floating rate zero coupon note purchase insurance policies to be offered one maturity at a time.

At block 507 the system calculates the future value escalation rate (FVER) for M years based on current and forecasted college cost escalation rates from block 508 and current and forecasted general inflation rates from block 509. FVER is the forecasted rate of escalation in the cost of the service or commodity whose uncertain future cost is to be defeased. Next at block 510 the system calculates the projected M-year yield on investments (YIELD) based on the schedule of interest rates obtainable on investments of different maturities at block 511. The value of RISK(M), the floating rate zero coupon note issuer's risk premium that compensates the issuer for cost escalation risk over the period extending M years into the future, is entered at block 512 from the schedule of said premiums at block 513. Next, the floating rate zero coupon note issuer's profit margin (MARGIN(M)), or a suitable estimate thereof, is entered at block 514 from the schedule of target profit margins at block 515. The calculation of the present value discount rate (PVDR) is accomplished at block 516. PVDR is the discount rate used to convert the projected future cost of the service or commodity, whose uncertain future cost as of the date the floating rate zero coupon note is scheduled to mature is to be defeased, back $M-1$ years so as to obtain the immediate cost of defeasing this future cost as of the end of the one year term of the insurance policy. PVDR is equal to the projected yield on investments (YIELD(M)) minus the risk premium (RISK(M)) minus the desired profit margin (PROFIT(M)). Then, at block 517, the current cost of college (CURRENT COLLEGE COST), which is obtained from block 518, is escalated at the future value escalation rate (FVER) over M years into the future and this compound amount is discounted back $M-1$ years at the present value discount rate (PVDR) to obtain the projected death benefit payment (BENEFIT) that corresponds to a floating rate zero coupon note that matures in M years according to the relation $$BENEFIT(M) = CURRENT\ COLLEGE\ COST \times [1+FVER(M)]^M / [1+PVDR(M)]^{M-1}$$

System control then passes to block 519 where the system initializes to 1 the variables R, which indicates the type (i.e., single-life, joint-life, or last-survivor) of life insurance policy; S, which indicates the sex of the insured; PROFILE 1, which indicates the risk profile of the first insured; and PROFILE 2, which indicates the risk profile of a second insured. The variables AGE 1, the age of the first insured, and AGE 2, the age of the second insured, are also initialized, to AGEMIN, the minimum age for purposes of calculating insurance policy premiums. Next, system flow moves to block 520 where nested loops begin. These loops determine the annual premiums for single-life policies based on the age and sex of the insured, and the risk profile of the insured. At block 520, the system retrieves the annual premium from the table of renewable term premium rates at block 521 based on the aforementioned characteristics of the insured. Next, at block 122 the system increments AGE 1, which represents the age of the insured, by 1. System flow then passes to test 523 where the system determines whether AGE 1 exceeds AGE-MAX, the maximum age for purposes of calculating insurance policy premiums. If not, control returns to block 520 for the next iteration. Otherwise all possible values for AGE 1 have been considered, and control passes to block 524 where AGE 1 is reset to AGEMIN. Next, at block 525 the variable PROFILE 1 is incremented by 1. Then at test 526 the system determines whether all risk profiles have been considered. If not, control returns to block 520 for the next iteration. Otherwise system flow moves to block 527 where PROFILE 1 is reinitialized to 1. Next, at block 528 the variable S is incremented by 1. Then at test 529 the system determines whether S exceeds 2. If not, control returns to block 520 for the next iteration. Otherwise, the process of determining the annual premiums for all the single-life policies the insurer will offer has been completed, and control passes to block 530.

At block 530, the system increments R by 1 and reinitializes PROFILE 1 to 1 and AGE 1 to AGEMIN. Control then passes to block 531 where a loop begins that determines the annual premiums to be charged on joint-life policies and last-survivor policies based on the policy type, age and sex of the two insureds, and the risk profiles of the two insureds. At block 531, the system retrieves the appropriate premium from the table of renewable term premium rates at block 532. Next, the variable AGE 1, which represents the age of the first insured, is incremented by 1 at block 533. Then at test 534 the system determines whether all possible values for AGE 1 have been considered. If not, system flow returns to block 531 for another iteration. Otherwise system flow passes to block 535 where AGE 1 is reinitialized to AGEMIN. Control then passes to block 536 where the variable AGE 2, which represents the age of the second insured, is incremented by 1. Next, at test 537 the system determines whether all possible values for AGE 2 have been considered. If not, control returns to block 531 for another iteration. Otherwise AGE 2 is reinitialized to AGEMIN to block 538 and the variable PROFILE 1, which represents the risk profile of the first insured, is incremented by 1 at block 539.

Next, control passes to test 540 where the system determines whether or not all possible risk profiles for the first insured have been considered. If not, control returns to block 531 for the next iteration. Otherwise, PROFILE 1 is reinitialized to 1 at block 541 and PROFILE 2, which represents the risk profile of the second insured, is incremented by 1 at block 542. Next, at test 543 the system determines whether all possible risk profiles for the second insured have been considered. If not, control returns to block 531 for the next iteration. Otherwise, PROFILE 2 is reinitialized to 1 at block 544, and S is incremented by 1 at block 545.

Next, control passes to test 546 where the system determines whether or not all possible sex categories have been considered. If not, control returns to block 531 for the next iteration. Otherwise S is reset to 3 at block 547, and R is incremented by 1 at block 548. Next the system tests at test 549 whether the annual premiums have been determined for all three types of policies. If not, control returns to block 531 to repeat the nested loops for the last-survivor policy (R=3). Otherwise, the process of determining annual premiums for all three types of policies and all characteristics of the insureds has been completed for the particular value of M.

System flow passes to block 550 where M is incremented by 1. Next at test 551 the system determines whether all possible floating rate zero coupon note maturities have been considered. If not, control returns to block 507 to repeat the entire loop for the next value of M. Otherwise, the process of calculating the annual premiums has been completed. Control moves to block 552 where the schedule of annual premiums is transmitted to the master data files where it can be accessed from the point-of-sale stations whenever premium rate information is needed. Alternatively, this schedule may be printed out. Table 2 illustrates a preferred format for this schedule of annual premiums, although it will of course be appreciated that other formats may be used. That operation completes the process of establishing the schedule of annual insurance premiums, and control passes to block 136 in FIG. 1B.

TABLE 2

Policy Type: Single-Life
Sex of Insured: Male
Risk Category: Standard Risk

Annual Premium Per $10,000 of Coverage

| Floating Rate Zero Coupon Note Maturity | Age of the Insured | | | | | |
|---|---|---|---|---|---|---|
| | 25 | 30 | 35 | 40 | 45 | 50 |
| 8/15/91 | $16.25 | $18.00 | $20.00 | $22.25 | $24.75 | $27.50 |
| 8/15/93 | 16.50 | 18.25 | 20.25 | 22.50 | 25.00 | 28.00 |
| 8/15/95 | 16.75 | 18.50 | 20.50 | 22.75 | 25.50 | 28.50 |
| 8/15/97 | 17.00 | 18.75 | 20.75 | 23.25 | 26.00 | 29.00 |
| 8/15/99 | 17.00 | 18.75 | 20.75 | 23.50 | 26.50 | 29.50 |
| 8/15/01 | 17.25 | 19.00 | 21.00 | 23.50 | 26.75 | 30.00 |

Referring now to FIGS. 6A-6B, there is shown a more detailed schematic flow chart for the asset portfolio update operation represented by block 136 in FIG. 1B. This operation enables the insurance manager to evaluate changes in the investment portfolio, to invest net income from insurance operations, to meet death benefit payment obligations, and to structure the investment portfolio so as to provide for funding future insurance obligations while maximizing the rate of return realized on the asset portfolio.

The process begins at block 601 where the schedule of projected insurance liabilities (LIABILITIES(K), K=1, ..., KMAX) is prepared based on current actuarial assumptions regarding mortality rates from block 602 and the current schedule of floating rate zero coupon note purchase insurance in force from block 603. The steps performed at block 601 result in a schedule of expected period-by-period future cash death benefit payment obligations, which must be covered by the stream of cash flow from the asset portfolio.

Next system flow passes to block 604 where the system calculates the amount of funds that are available for investment. The inputs to this calculation are the current market value of the assets portfolio (ASSETS) from block 605 and the amount of cash available for investment (CASH), largely as a result of premium payments and interim cash payments from the asset portfolio, from block 606.

The results of the funds availability calculation at block 604, along with the schedule of projected insurance liabilities prepared according to block 601, are used at block 607 for the calculation of the implicit cost of the insurance liabilities. The cash flow stream (LIABILITIES(K), K=1, ..., KMAX) is used together with the market value of the assets portfolio (ASSETS) calculated at block 605 and the amount of available cash (CASH) from block 606 to obtain the implicit cost of the insurance liabilities (COST). COST is calculated as the internal rate of return of the projected insurance liability stream. Next, system flow passes to block 608 where the system reexpresses COST on a semi-annual-equivalent basis by applying the equation $$SACOST = 2 \times [(1+COST)^{FREQ/2} - 1]$$

using the number of liability cash flow periods per year (FREQ) from block 609, where SACOST denotes the semi-annual-equivalent implicit cost of the insurance liabilities. Next, system flow passes to block 610 for the selection of the new asset portfolio. Provided to block 610 ar data concerning projected interest rate levels (block 611); a schedule of securities that are available for investment, the yields currently obtainable through those investments and commissions and other transaction costs associated with purchasing or selling any of these securities (block 612); and the current composition of the asset portfolio (block 613). The insurance manager supplies the portfolio investment criteria to be applied in portfolio selection at block 614. These criteria might include, for example, the following types of restrictions:

No less than 20% of the assets invested in U.S. Treasury securities;

No assets in debt securities rated lower than single-A by Moody's Investor's Service, Inc. or Standard & Poor's Corporation; and No more than 50% and no fewer than 25% of the assets in debt securities whose interest rates float.

The foregoing restrictions are presented for illustrative purposes only. Of course, different restrictions may be imposed without departing from the invention.

At block 610, the system selects a list of securities that meet the investment criteria from among the candidate securities in light of the available yields, the cost of effecting transactions, the current portfolio, and the portfolio investment criteria. The system displays the options to the insurance manager, who enters the selection of investments into the system at block 610. In addition, the system determines as part of the asset selection process how much cash to have on hand the next day to cover death benefit payment obligations that must be met that day. The steps performed at block 610 thus determine how, and in what amount, funds are to be allocated among the available investment alternatives.

System flow then passes to block 615 where the system calculates the stream of cash flows the asset portfolio will generate over time (RETURN(K), K=1, ..., KMAX) and on to block 616 where the system calculates the yield on the asset portfolio (YIELD). The stream of cash flows calculated at block 615 is used together with the market value of the asset portfolio calculated at block 605 and the amount of available cash from block 606 to calculate this yield at block 616. The YIELD is calculated as the internal rate of return of the stream of periodic cash flows in the same manner as the calculation of COST at block 607. Next, at block 617, the system converts YIELD to a semi-annual-equivalent basis by applying the equation $$SAYIELD = 2 \times [(1+YIELD)^{FREQ/2} - 1]$$

where FREQ is the number of portfolio cash flow periods per year from block 618. SAYIELD denotes the semi-annual-equivalent yield on the asset portfolio.

Next, system flow passes to two tests which evaluate the new asset portfolio. First, test 619 determines whether or not the yield on the new portfolio (SAYIELD) exceeds the implicit cost of the projected insurance liability stream (SACOST). Second, test 620 determines whether the expected cash inflow from the new asset portfolio exceeds the projected insurance obligations period-by-period. Only if the insurance manager's selections pass both tests are the transactions required to update the asset portfolio carried out. Otherwise, control returns to the portfolio selection step (block 610) via block 614 at which the deficiencies of the selected investments are displayed to the insurance manager so that the portfolio investment criteria can be revised and a new selection of investments made. The selection and evaluation loop (blocks 610, 614, 619, and 620) continues until the insurance manager is satisfied that the rate of return on the asset portfolio is maximized subject to meeting the investment criteria and to meeting the two tests imposed by the system.

The tests 619 and 620 can be reexpressed in equivalent mathematical form as inequalities that must be satisfied. In such cases, the portfolio selection problem can be expressed in terms of what is referred to in the art as a mathematical programming problem, which takes the following general form:

| maximize (choice of investments) | objective function |
|---|---|
| subject to | constraint set. |

Depending on the precise mathematical form of the mathematical programming problem, a computer can be programmed to "solve" the problem by making the choice of investments (e.g., amounts of bonds of specific types and specific maturities) that maximize the stated objective (e.g., maximize yield) subject to the specified constraints (i.e., the portfolio selected must pass tests 619 and 620).

After the new asset portfolio has passed tests 619 and 620, control passes to block 621 where the new asset portfolio is compared to the old asset portfolio, and the asset purchases and sales required to update the asset portfolio are determined. System flow then passes to block 622 where the buy and sell orders required to update the asset portfolio are executed by the insurance manager. Then the asset portfolio data file is updated at block 623 to reflect the new composition of the asset portfolio At this point the asset portfolio update operation has been completed, and control passes to block 137 in FIG. 1B.

Referring now to FIGS. 7A-7B, there is shown a more detailed schematic flow chart for the billing of customers for payment of annual premiums and for the annual reporting to policy holders represented by block 139 in FIG. 1C. That operation involves producing regular (e.g., annual) reports to policy holders itemizing the floating rate zero coupon note insurance policies in the policy holder's account and summarizing account activity (e.g., purchases of new policies and premiums paid on existing policies) during the period The process begins at block 701 where the system initializes the account number counter T to 0, the policy number counter M to 0, and the variable TOTAL to the total number of accounts in the master account file at block 702. Control then passes to block 703 where T is incremented by 1 and a loop begins. The accounts are processed sequentially from the first to the last. Next, at test 704, the system determines whether the day in question is the end of the customer reporting period for any policy in account number T by consulting the master account file at block 702. If not, control passes to block 720 to determine whether there are any additional accounts to examine. Otherwise a customer report is due to be sent to the holder of account number T, and control passes to block 705. At block 705, the system retrieves from the master account file at block 702 the total number of policies in the account (MAX), the target schedule of floating rate zero coupon notes as specified by the account holder (TARGET), and the schedule of floating rate zero coupon notes held (HELD) in the beneficiary accounts. The routine automatically adjusts the schedule of insurance policies to cover the difference, floating rate zero coupon note by floating rate zero coupon note, between the target schedule of floating rate zero coupon notes and those actually held. In that way, the number of floating rate zero coupon notes of each desired maturity actually held in accounts for each beneficiary plus the number of floating rate zero coupon notes of each respective maturity insured on behalf of that beneficiary will conform exactly as of the annual billing date to the target schedule of floating rate zero coupon notes for that particular individual. The target schedule of floating rate zero coupon notes and the floating rate zero coupon note beneficiary accounts are specified at the time the floating rate zero coupon note insurance is purchased at block 212 of FIG. 2.

Next, system flow passes to block 706 where the variable BALANCE OWED, which will indicate at the end of the routine the aggregate premiums due the insurer from the holder of account number T, is initialized to 0. Control then passes to block 707 where a nested loop begins. The policies in account number T are processed sequentially from the first to the last. At block 707 the policy number counter M is incremented by 1. Next, at test 708 the system determines whether the day in question is the billing date for policy number M in account number T. If not, control passes to test 709 where the system determines whether the floating rate zero coupon note whose purchase was being insured has matured. If so, control passes to block 710 where the system deletes the policy from the master account file and then on to test 718 to determine whether there are any additional policies in the account to process. If the underlying floating rate zero coupon note has not matured, then control passes directly to test 718.

If it is determined at test 708 that the day in question is the billing date for policy number M in account number T, then control passes to block 711 where the system determines the amount of coverage desired (COVERAGE(M)), expressed as the fraction, which may be greater than, equal to, or less than one, of the floating rate zero coupon note whose purchase is to be insured, by subtracting the amount of the floating rate zero coupon notes of the type covered by policy number M that are actually held by or on behalf of the insurance policy's beneficiary (or beneficiaries) (HELD(M)) from the target amount (TARGET(M)). Next, at test 712 the system determines whether the desired level of insurance coverage for that particular type of floating rate zero coupon note is greater than zero. If not, no coverage is desired so that control passes to test 718. Otherwise coverage is desired, and control moves to block 713.

At block 713, the system retrieves the policy specification, personal data, and risk characteristics of the insureds from the master account file at block 702. Next, at block 714, the appropriate annual premium (PREMIUM) for a policy insuring one full floating rate zero coupon note of the type in question is retrieved from the schedule of annual premiums at block 715. Then at block 716 the annual premium for a full unit of coverage is multiplied by the fraction of the full unit for which coverage is desired to get the amount of the premium (AMOUNT(M)), expressed in dollars, the account holder owes on policy number M. Next, at block 717 the aggregate balance the holder of account number T owes (BALANCE OWED) is incremented by the amount of the premium owed on the policy just processed. This completes the processing of policy number M in account number T.

System control then passes to test 718 to determine whether all the policies in account number T have been processed. If not, control returns to block 707 to begin processing the next policy in account number T. Otherwise, the nested loop ends, and control moves to block 719. At block 719, all the policies in account number T have been processed so the system sends the account holder a premium notice indicating the balance of premiums owed and listing the policies on which premiums are due, specifying the amount of insurance coverage provided, the premium for one full unit, and the premium owing on the fractional unit covered by the insurance policy for each policy on which a premium is due, and also sending the account holder a summary statement of account. Table 3 illustrates a preferred format for the end-of-period report to the policy holder, although of course other formats may be used.

TABLE 3

| Name of Policy Holder: | JOHN Q. INSURED |
| Address: | 1 MAIN STREET CITY, STATE ZIP |
| Account Number: | 001-123456 |
| Statement Date: | December 31, 1985 |
| Balance You Owe: | $28.13 |

| | Schedule of Premiums Owed | | | |
| Policy | Coverage Provided | | Premium | Premium |
| Number | Note Maturity | Amount | Per Unit | Due |
| 001-123456-01 | 8/15/98 | 0.25 | $18.75 | $ 4.69 |
| 001-123456-02 | 8/15/99 | 0.50 | 18.75 | 9.38 |
| 001-123456-03 | 8/15/00 | 0.75 | 18.75 | 14.06 |
| | | | TOTAL | $28.13 |

| | Schedule of Coverage | | |
| Policy | Coverage Provided | | |
| Number | Note Maturity | Amount | Status |
| 001-123456-01 | 8/15/98 | 0.25 | Premium Due |
| 001-123456-02 | 8/15/99 | 0.50 | Premium Due |
| 001-123456-03 | 8/15/00 | 0.75 | Premium Due |
| 001-123456-04 | 8/15/01 | 1.00 | Paid Up Through 6/30/86 |

Next, system flow passes to block 720 where the variable M is reinitialized to zero. Control then passes to test 721 where the system determines whether all the accounts have been processed. If not, control returns to block 703 to begin processing the next account. Otherwise all the accounts have been processed and the loop terminates. At this point the customer billing and reporting operation has been completed, and control passes to test 140 in FIG. 1C to prepare the end-of-period financial statements and report to the fund manger that were discussed earlier with reference to FIGS. 1A-1C.

Hardware Description

The various conventional elements making up the hardware system for implementing the invention and their interrelationships are shown in FIG. 8.

At each point-of-sale station, such as the office of a savings bank or the office of a securities broker, there is a CRT user terminal (block 801). The hardware system includes a plurality of these terminals. Each terminal (block 801) communicates with a central computer (block 803) through a control unit (block 802). Each control unit serves a number of point-of-sale stations. A control unit controls the point-of-sale terminals it serves; receives purchase orders, premiums payments, death benefit payment requests, means of verifying the death of the insured, and account inquiries from the point-of-sale stations, and transmits them to the central computer; and receives account verifications, transaction verifications, insurance premiums, and responses to customer inquiries, from the central computer (block 803) and transmits them to the appropriate point-of-sale stations.

The central computer (block 803) also transmits death benefit payments and notifications of automatic premium loans to the floating rate zero coupon note issuer (block 805).

The central computer (block 803) contains storage space for data relating to transactions that are in process; processes all purchase, premium payment, and death benefit payment calculations and transactions in the manner diagrammed in FIGS. 1A-5C; performs the asset portfolio update operation in the manner diagrammed in FIGS. 6A-6B; and performs the individual investor record-keeping, premium billing, and periodic reporting operation in the manner diagrammed in FIGS. 7A-7B.

The central computer (block 803) transmits information to and receives information from the master data files (block 806) as required in order to retrieve the schedule of floating rate zero coupon note prices (block 116 of FIG. 1A and block 310 of FIG. 3), retrieve the schedule of annual premiums (block 123 of FIG. IA and block 715 of FIG. 7A), augment the schedule of policy loans for transmittal to the floating rate zero coupon note issuer (block 420 of FIG. 4B), update the floating rate zero coupon note insurance schedule (block 426 of FIG. 4B), retrieve the schedule of available floating rate zero coupon notes (block 502 of FIG. 5A), retrieve current and forecasted college cost escalation rates (block 508 of FIG. 5A), retrieve current and forecasted general inflation rates (block 509 of FIG. 5A), retrieve the schedule of interest rates obtainable on investments of different maturities (block 511 of FIG. 5A), retrieve the schedule of insurer's risk premiums (block 513 of FIG. 5A), retrieve the schedule of target profit margins (block 515 of FIG. 5A), retrieve the current cost of college (block 518 of FIG. 5A), retrieve the appropriate premium from the table of renewable term premium rates (block 521 of FIG. 5A and block 532 of FIG. 5B), transmit the schedule of annual insurance premiums to the master data files (block 552 of FIG. 5), and perform the asset portfolio update operation in the manner diagrammed in FIGS. 6A-6B.

The central computer (block 803) also transmits information to and receives information from the master account file (block 807) as indicated in blocks 109, 113, 118, 120, 122, and 126 of FIG. 1A; block 303 of FIG. 3; blocks 402 and 418 of FIG. 4A; and blocks 702 and 710 of FIG. 7A. The central computer (block 803) also transmits information to and receives information from the master transaction file (block 808) in connection with insurance purchase, annual premium payment, and death benefit payment transactions (block 131 of FIG. 1B); preparation of the daily transaction summary (block 137 of FIG. 1B); and recording of policy loans (block 418 of FIG. 4A). The central computer (block 803) also transmits end-of-period financial statements to the accounting files (block 809) for storage and retrieves these statements from the accounting files (block 809) when prompted by the input/output devices of the central computer (block 810).

The insurance manager has a complement of input-/output devices (block 810). Into the input devices are entered requests for the daily and periodic reports to the insurance manager (block 144 of FIG. 1C) and the premium notices and policy holder reports (block 719 of FIG. 7B) and instructions for managing and controlling the hardware system and its software. The output devices are used to obtain the daily and periodic reports to the insurance manager (block 144 of FIG. 1C), notices of policy cancellation (block 413 of FIG. 4A), notices of automatic premium loan and policy extension (block 421 of FIG. 4B), aggregate daily amount of automatic premium loans and schedule of such loans (block 425 of FIG. 4B), and annual premium notices and summary statements of account (block 719 of FIG. 7B).

Figure 9:
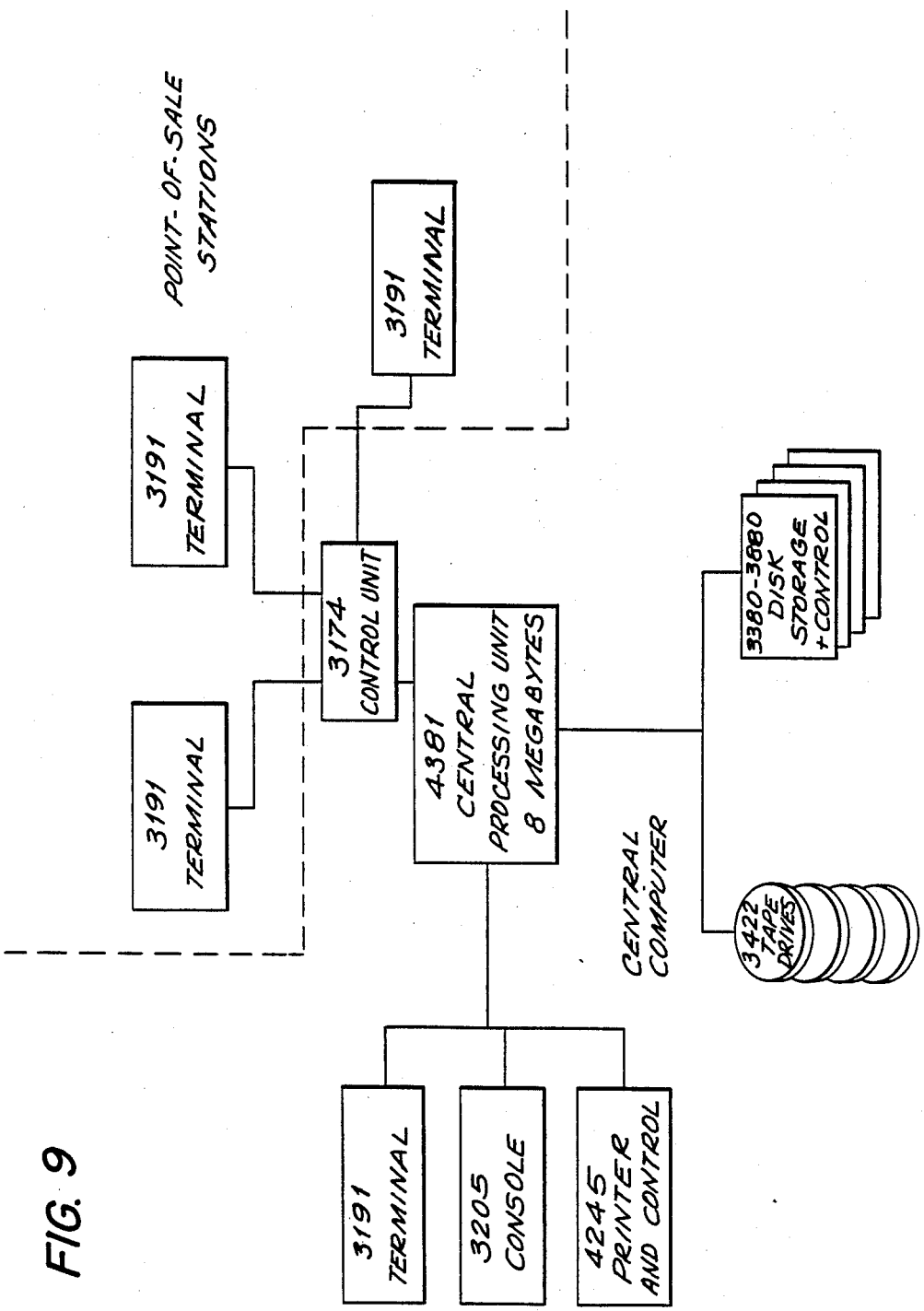
FIG. 9 is a block diagram showing a portion of the computer system of FIG. 8 in more detail.

FIG. 9 provides a schematic diagram of a version of the basic hardware system of FIG. 8. The exemplary system includes the following types and numbers of commercially available devices:

| No. | Make | Model | Item in FIG. 8 | |
|---|---|---|---|---|
| 3 | IBM | 3191 | CRT user terminal | 801 |
| 1 | IBM | 3174 | Control unit | 802 |
| 1 | IBM | 4381 | Central computer | 803 |
| 4 | IBM | 3380-3880 | Disks | 806-809 |
| 4 | IBM | 3422 | Tape drives | |
| 1 | IBM | 3191 | CRT user terminal | 810 |
| 1 | IBM | 3205 | Console | |
| 1 | IBM | 4245 | Printer | |

It is to be understood that there are a large number of commercially available substitutes for each item of hardware which could be combined into fully compatible systems. Accordingly, the scope of the invention is not limited by the particularity of the hardware system in FIGS. 8 and 9.

Software Description

The methods which are diagrammed in FIGS. 1A-7B are implemented on the hardware system diagrammed in FIG. 8 by embodying the flow-charted routines into a series of software packages that follow the sequence of steps diagrammed in FIGS. 1A-7B. Conventional software packages are commercially available which can perform, or can readily be adapted to perform, certain of the steps diagrammed in FIGS. 1A-7B. Accordingly, as described below, it is not necessary in order to implement the invention to write software for each step from scratch.

The Point-of-Sale software package marketed by International Business Machines (IBM) is a general interactive data package for point-of-sale applications that can readily be formatted to provide the precise means of receiving customer orders and inquiries indicated in blocks 102, 103, and 104 of FIG. IA and transmitting the responses to customer inquiries called for in block 110 of FIG. IA and the transaction reports called for in block 106 of FIG. 1A.

The Interactive Financial Systems (IFS) library of software packages marketed by IBM contains a set of general financial and accounting packages that can readily be adapted and formatted to provide the data base management, accounting, and financial reporting operations required to implement the invention. Part I of IFS contains data base management routines, which can be used to manage the master data files at block 806 of FIG. 8, the master account file at block 807 of FIG. 8, the master transaction file at block 808 of FIG. 8, and the accounting files at block 809 of FIG. 8. It also contains routines that can readily be adapted to handle the account management functions described in FIG. 2. Part II of IFS contains general routines that implement general ledger maintenance and prepare financial statements and related schedules. It can readily be adapted and formatted to provide the precise means of preparing the daily transaction summary and summary of current position called for in block 137 of FIG. 1B; the premium notices and end-of-period reports to policy holders called for in block 139 of FIG. 1C and described in greater detail in block 719 of FIG. 7B; the end-of-period investment performance and position report called for in block 141 of FIG. 1C; the end-of-period financial statements called for in block 142 of FIG. 1C; and the report to the insurance manager called for in block 144 of FIG. 1C.

The software needed to implement each of the remaining routines that are diagrammed in FIGS. 1A–7B may readily be written in any of a number of available user languages, such as FORTRAN, by following the sequence of steps diagrammed in FIGS. 1A–7B.

The MVS/XA software package marketed by IBM contains a complete operating system software package for operating the hardware system diagrammed in FIG. 8.

One skilled in the art will appreciate that the present invention can be practiced by other than the embodiments described, which are presented for purposes of illustration and not of limitation, and the present invention is limited only by the claims that follow.

What is claimed is:

1. A data processing system for administering an insurance program to insure, upon the death of a prospective purchaser of a floating rate zero coupon note, the availability of financial means for purchasing the floating rate zero coupon note, said note being issued by an issuer and designed to fully fund a future liability whose projected due date and whose present cost are known but whose future cost is unknown but can be projected with some risk factor, said system comprising:

means for issuing into a floating rate zero coupon note purchase insurance account a periodically renewable term life insurance policy to insure the availability of financial means to purchase a floating rate zero coupon note having a scheduled maturity date to fund the purchase of a particular service or commodity, each said prospective purchaser holding at least one policy in said floating rate zero coupon note purchase insurance account;

account list means for storing an account list of current information for each floating rate zero coupon note purchase insurance account into which said issuing means has issued a policy;

means for entering insurance purchase, periodic premium payment, and death benefit payment request data and customer inquiries;

means responsive to said entering means and operating on said account list means for processing periodically said insurance purchase, periodic premium payment, and death benefit payment request data to update said account list;

means responsive to a death benefit payment request entered through said entering means for calculating the amount of the death benefit payable upon the death of the insured to at least one designated beneficiary account;

means responsive to said issuing means for establishing the schedule of periodic premiums to be charged for said insurance based on a projected death benefit payment, type of life insurance policy selected, sex of the insured, age of the insured, and risk profile of the insured wherein the projected death benefit payment under said life insurance policy is determined on the basis of maturity of the floating rate zero coupon note cost of the service or commodity at time of purchase, current and forecasted future rate of escalation in the cost of the service or commodity, current and forecasted general inflation rates, projected yields available on investment instruments, the floating rate zero coupon note issuer's risk premium, and the floating rate zero coupon note issuer's target profit margin, said schedule including a premium payment grace period;

means for drawing automatic premium loans to make a premium payment at the end of the premium payment grace period;

asset position list means for storing an asset position list of current information concerning a portfolio of investments purchased with insurance policy premiums and interim investment cash flows;

portfolio management means for selecting portfolio of securities and updating said asset position list periodically, based on an amount of cash that is available for investment, current composition of the asset portfolio, projected cash need for the following period, projected aggregate floating rate zero coupon note purchase insurance liability schedule, and predefined portfolio selection criteria, in order to generate a stream of cash flows from the asset portfolio that will be sufficient to cover in full in a timely manner the cost of meeting death benefit payment obligations;

means for recording the selected security purchase and sale transaction data to update the asset position list;

management reporting means responsive to said issuing means, said account list means, said entering means, said processing means, said portfolio management means and said recording means for periodically generating a report including a summary of insurance purchases, periodic premium payments, and death benefit payment transactions, asset and liability position, and investment performance;

investor billing and reporting means responsive to said schedule establishing means and said account list means for sending policy holders periodic premium notices and status reports of their accounts; and transaction and inquiry reporting means responsive to said entering means, said account list means, said schedule establishing means and said investor billing and reporting means for confirming individual transactions and responding to inquiries from customers.

2. The data processing system of claim 1, wherein said death benefit calculating means comprises:

means for compiling a list of all the floating rate zero coupon note purchase insurance policies in an account on which a death benefit payment request has been made;

means responsive to said compiling means for determining which type of life insurance policy each policy in said account is;

means for determining whether the death of each insured has been verified;

means responsive to said policy type determining means and said death verification determining means for determining the amount of death benefit payable under each policy for which the death of each insured has been verified; and means responsive to said compiling means and said amount determining means for determining aggregate death benefit papable under at such policies pn a particular account.

3. Processing system of claim 1, wherein said automatic premium loan drawing means comprises:

means for determining when the end of the premium payment grace period under any particular policy has occurred;

means for determining whether underlying beneficiary floating rate zero coupon note accounts contain sufficient accrued interest to pay the remaining balance of the premium due in full or to make a partial premium payment;

means responsive to said grace period end determining means and said accrued interest sufficiency determining means for calculating the fractional period over which the policy can be extended by utilizing the available accrued interest to pay all or a portion of the periodic premium; and means responsive to said fractional period calculating means for determining aggregate daily automatic premium loans.

4. The data processing system of claim 1, wherein said periodic premium schedule establishing means comprises:

means for determining a future value escalation rate based on information concerning at least the projected rate of change of the cost of the service or commodity;

means for determining a present value discount rate by subtracting an insurer's risk premium rate and a target profit margin from investment yield obtainable upon investment of funds received from the sale of said floating rate zero coupon note purchase insurance policies and reinvestment of any interim cash flows;

means responsive to said determined future value esculation rate and said determined present value discount rate for calculating a projected death benefit payment by compounding the current cost of the service or commodity over the life of the floating rate zero coupon note to be purchased with the death benefit payment at said future value escalation rate and discounting at said present value discount rate; and means responsive to said projected death benefit for determining a periodic premium on any particular floating rate zero coupon note purchase insurance policy based o the projected death benefit payment, the type of life insurance policy, the sex of each insured, the age of each insured, and the risk profile of each insured.

5. The data processing system of claim 1, wherein said portfolio management and updating means comprises:

means for determining a schedule of projected insurance liabilities based on an aggregate insurance schedule and actuarial data regarding likelihood of death occurring prior to the expiration of the paid-up term of each life insurance policy in said schedule;

means responsive to said asset position list means for determining the amount of funds available for investment based on the amount of cash on hand and the current market value of the asset portfolio;

means responsive to said liability schedule determining means for calculating a composite cost of the insurance liabilities; and means responsive to the schedule of projected insurance liabilities, amount of funds available for investment, schedule of yields currently available for investment, and the current composition of the asset portfolio for selecting securities to be purchased or sold, for calculating a yield on the asset portfolio and for evaluating the effect of the selected purchases or sales on the portfolio in order to reject any selection that would result in a yield on the portfolio that is less than the composite cost of the insurance liabilities and in order to reject also any selection that would result in a projected income stream for which the projected cash availability for any period is less than the projected death benefit payment liability for said period.

6. Processing system of claim 1, wherein said investor billing and reporting means comprises:

means means responsive to said account list for determining when a policy holder should be sent [an annual a periodic premium notice;

means responsive to said account and said entering means for adjusting the amount of coverage a floating rate zero coupon note purchase insurance policy provides based on the number of floating rate zero coupon notes of each maturity the policy beneficiary would ultimately like to own and the respective numbers of floating rate zero coupon notes owned by at least one of the beneficiary and another holding on the beneficiary's behalf;

means responsive to said schedule establishing means a said premium notice sending determination means for determining a premium due on each policy on which a premium notice is to be sent; and means responsive to said due premium determining determining an aggregate premium balance owed by each account holder who is to be sent a premium notice.

7. Method for administering an insurance program to insure, upon the death of a prospective purchaser of a floating rate zero coupon note, the availability of financial means for purchasing the floating rate zero coupon note, said note being issued by an issuer and designed to fully fund a future liability whose projected due date and whose present cost are known but whose future cost is unknown but can be projected with some risk factor, said method comprising the steps of:

issuing into a floating rate zero coupon note purchase insurance account a periodically renewable term life insurance policy to insure the availability of financial means to purchase a floating rate zero coupon note having a scheduled maturity date to fund the purchase of a particular service or commodity, each said prospective purchaser holding at least one policy in said floating rate zero coupon note purchase insurance account;

maintaining an account list of current information for each floating rate zero coupon note purchase insurance account into which a policy has been issued;

entering insurance purchase, periodic premium payment, and death benefit payment request data and customer inquiries into a data processing system;

responsive to said data entry and operating on said account list, processing periodically said insurance purchase, periodic premium payment, and death benefit payment request data to update said account list;

responsive to an entered death benefit payment request, ca . the amount of the death benefit payable upon the death of the insured to at least one designate beneficiary account;

establishing responsive to said issuing step the schedule of periodic premiums to be charged for said insurance based on a projected death benefit payment, type of life insurance policy selected, sex of the insured, age of the insured, and risk profile of the insured wherein the projected death benefit payment under said life insurance policy is determined on the basis of maturity of the floating rate zero coupon note, cost of the service or commodity at the time of purchase, current and forecasted future rate of escalation in the cost of the service or commodity, current and forecasted general inflation rates, projected yields available on investment instruments, the floating rate zero coupon note issuer's risk premium, and the floating rate zero coupon note issuer's target profit margin, said schedule including a premium payment grace period;

drawing automatic premium loans to make a premium payment at the end of the premium payment grace period;

maintaining an asset position list of current information concerning a portfolio of investments purchased with insurance policy premiums and interim investment cash flows;

selecting a portfolio of securities and update said asset position list periodically, based on an amount of cash that is available for investment, current composition of the asset portfolio, projected cash need for the following period, projected aggregate floating rate zero coupon note purchase insurance liability schedule, and predefined portfolio selection criteria, thereby generating a stream of cash flows from the asset portfolio that will be sufficient to cover in full in a timely manner the cost of meeting the death benefit payment obligations;

recording the selected security purchase and sale transaction data to update the asset position list;

responsive to said issuing step, said account list main step, said entering step, said processing step, said selecting and updating step, and said recording step, periodically generating a report including a summary of insurance purchase, periodic premium payment, and death benefit payment transactions, asset and liability position, and investment performance;

have to said schedule establishing step and said account list maintaining step, sending policy holders periodic premium notices and status reports of their accounts; and responsive to said entering step, said account list mail step, said schedule establishing step and said sending step, confirming individual transactions and responding to inquiries from customers.

8. The data processing method of claim 7, wherein said death benefit calculating step comprises:

compiling a list of all floating rate zero coupon note purchase insurance policies in an account on which a death benefit payment request has been made;

responsive to said compiling step, determining which type of life insurance policy each policy in said account is;

determining whether the death of each insured verified;

responsive to said policy type determining step an said death verification determining step, determining the amount of death benefit payable under each policy for which the death of each insured has been verified; and responsive to said compiling step and said amount determining step, determining an aggregate death benefit payable under all such policies in a particular account.

9. The data processing method of claim 7, wherein said automatic premium loan drawing step comprises:

determining when the end of the premium payment grace period under any particular policy has occurred;

determining whether underlying beneficiary floating rate zero coupon note accounts contain sufficient accrued interest to pay the remaining balance of the premium due in full or to make a partial premium payment;

responsive to said grace period end determining step and accrued interest sufficiency determining step, calculating the fractional period over which the policy can be extended by utilizing the available accrued interest to pay all or a portion of the periodic premium; and responsive to said fractional period calculating step, determining aggregate daily automatic premium loans.

10. The data processing method of claim 7, wherein said periodic premium schedule establishing step comprises:

determining a future value escalation rate based on information concerning at least the projected rate of change of the cost of the service or commodity;

determining a present value discount rate by subtracting an insurer's risk premium rate and a target profit margin from investment yield obtainable upon investment of funds received from sale of said floating rate zero coupon note purchase insurance policies and reinvestment of any interim cash flows;

responsive to said determined future value escalation rate and said determined present value discount rate, calculating a projected death benefit payment by compounding the current cost of the service or commodity over the life of the floating rate zero coupon note to be purchased with the death benefit payment at said future value escalation rate and discounting at said present value discount rate; and responsive to said projected death benefit, determining a periodic premium on any particular floating rate zero coupon note purchase insurance policy based on the projected death benefit payment, the type of life insurance policy, the sex of each insured, the age of each insured, and the risk profile of each insured.

11. The data processing method of claim 7, wherein said portfolio selecting and updating step comprises:

determining a schedule of projected insurance liabilities based on an aggregate insurance schedule and actuarial data regarding likelihood of death occurring prior to the expiration of the paid-up term of each life insurance policy in said schedule;

responsive to said asset position list maintaining means, determining the amount of funds available for investment based on the amount of cash on hand and the current market value of the asset portfolio;

responsive to said determined liability schedule, calculating a composite cost of the insurance liabilities; and responsive to the schedule of projected insurance liabilities, amount of funds available for investment, schedule of yields currently available for investment, and the current composition of the asset portfolio, selecting securities to be purchased or sold, calculating a yield on the asset portfolio and evaluating the effect of the selected purchases or sales on the portfolio, rejecting any selection that would result in a yield on the portfolio that is less than the composite cost of the insurance liabilities and rejecting also any selection that would result in a projected income stream for which the projected cash availability for any period is less than the projected death benefit payment liability for said period.

12. Data processing method of claim 7, wherein said policy holder periodic premium notice and report sending step comprises:

responsive to said maintained account list, determining when a policy holder should be sent a periodic premium notice;

responsive to said account list maintaining step an said entering step, adjusting the amount of coverage a floating rate zero coupon note purchase insurance policy provides based on the number of floating rate zero coupon notes of each maturity the policy beneficiary would ultimately like to own and the respective numbers of floating rate zero coupon notes owned by at least one of the beneficiary and another holding on the beneficiary's behalf;

responsive to said established schedule and said premium notice sending determination, determining a premium due on each policy on which a premium notice is to be sent; and responsive to said due premium determination, determining an aggregate premium balance owed by each account holder who is to be sent a premium notice.

13. A data processing system for administering an insurance program to insure, upon the death of a prospective purchaser of a floating rate zero coupon note, the availability of financial means for purchasing the floating rate zero coupon note, said note being issued by an issuer and designed to fully fund a future liability whose projected due date and whose present cost are known but whose future cost is unknown but can be projected with some risk factor, said system comprising:

means for issuing into a floating rate zero coupon note purchase insurance account a periodically renewable term life insurance policy to insure the availability of financial means to purchase a floating rate zero coupon note having a scheduled maturity date to fund the purchase of a particular service or commodity, each said prospective purchaser holding at least one policy in said floating rate zero coupon note purchase insurance account;

account list means for storing an account list of current information for each floating rate zero coupon note purchase insurance account into which said issuing means has issued a policy;

means for entering insurance purchase, periodic premium payment, and death benefit payment request data and customer inquiries;

means responsive to said entering means and operating on said account list means for processing periodically said insurance purchase, periodic premium payment, and death benefit payment request data to update said account list;

means responsive to a death benefit payment request en through said entering means for calculating the amount of the death benefit payable upon the death of the insured to at least one designated beneficiary account;

means responsive to said issuing means for establishing the schedule of periodic premiums to be charged for said insurance based on a projected death benefit payment and type of life insurance selected, wherein the projected death benefit payment under said life insurance policy is determined on the basis of maturity of the floating rate zero coupon note, cost of the service or Commodity at time of purchase, the floating rate zero coupon note issuer's risk premium, and the floating rate zero coupon note issuer's target profit margin, said schedule including a premium payment race period;

means for drawing automatic premium loans to make a payment at the end of the premium payment race period;

asset position list means for storing an asset position of current information Concerning a portfolio of investments purchased with insurance policy premiums and interim investment cash flows;

portfolio management means for selecting a portfolio of securities and updating said asset position list periodically, based on an amount of cash that is available for investment current composition of the asset portfolio, projected cash need for the following period, projected aggregate floating rate zero coupon note purchase insurance liability schedule, and predefined portfolio selection criteria, in order to generate a stream of cash flows from the asset portfolio that will be sufficient to Cover in full in a timely manner the cost of meeting death benefit payment obligations;

means for recording the selected security purchase an transaction data to update the asset position list;

management reporting means responsive to said issuing means, said account list means, said entering means, said processing means, said portfolio management means and said recording means for periodically generating a report including a summary of insurance purchases, periodic premium payments, and death benefit payment transactions, asset and liability position, and investment performance;

investor billing and reporting means responsive to said s establishing means and said account list means for sending policy holders periodic premium notices and status reports of their accounts; and transaction and inquiry reporting means responsive to said entering means, said account list means, said schedule establishing means and said investor billing and reporting means for confirming individual transactions and responding to inquiries from customers.

14. The data processing system of claim 13, wherein: said schedule of periodic premiums is further based on sex of the insured, age of the insured, and risk profile of the insured; and said projected death benefit payment is further based on current and forecasted future rate of escalation in the cost of the service or commodity, current and forecasted general inflation rates, and projected yields available on investment instruments.

15. The data processing system of claim 13, wherein said death benefit calculating means comprises:

means for compiling a list of all the floating rate zero coupon note purchase insurance policies in an account on which a death benefit payment request has been made;

means responsive to said compiling means for determining which type of life insurance policy each policy in said account is;

means for determining whether the death of each insured has been verified;

means responsive to said policy type determining means and said death verification determining means for determining the amount of death benefit payable under each policy for which the death of each insured has been verified; and means responsive to said compiling means and said amount determining means for determining aggregate death benefit payable under all such policies in a particular account.

16. The data processing system of claim 13, wherein said automatic premium loan drawing means comprises:

means for determining when the end of the premium payment grace period under any particular policy has occurred;

means for determining whether underlying beneficiary floating rate zero coupon note accounts contain sufficient accrued interest to pay the remaining balance of the premium due in full or to make a partial premium payment;

means responsive to said grace period end determining means and said accrued interest sufficiency determining means for calculating the fractional period over which the policy can be extended by utilizing the available accrued interest to pay all or a portion of the periodic premium; and means responsive to said fractional period calculating means for determining aggregate daily automatic premium loans 17. The data processing system of claim 13, wherein said periodic premium schedule establishing means comprises:

means for determining a future value escalation rate based on information concerning the projected rate of change of the cost of the service or commodity;

means for determining a present value discount rate by an insurer's risk premium rate and a target profit margin from investment yield obtainable upon investment of funds received from the sale of said floating rate zero coupon note purchase insurance policies and reinvestment of any interim cash flows;

means responsive to said determined future value escalation rate and said determined present value discount rate for calculating a projected death benefit payment by compounding the current cost of the service or commodity over the life of the floating rate zero coupon note to be purchased with the death benefit payment at said future value escalation rate and discounting at said present value discount rate; and means responsive to said projected death benefit for determining a periodic premium on any particular floating rate zero coupon note purchase insurance policy based on the projected death benefit payment and the type of life insurance policy.

18. The data processing system of claim 17, wherein said periodic premium determining means further bases said periodic premium on the sex of each insured, the age of each insured, and the risk profile of each insured.

19. The data processing system of claim 13, wherein said portfolio management and updating means comprises:

means for determining a schedule of projected insurance liabilities based on an aggregate insurance schedule and actuarial data regarding likelihood of death occurring prior to the expiration of the paid-up term of each life insurance policy in said schedule;

means responsive to said asset position list means for determining the amount of funds available for investment based on the amount of cash on hand and the current market value of the asset portfolio;

means responsive to said liability schedule determining means for calculating a composite cost of the insurance liabilities; and means responsive to the schedule of projected insurance liabilities, amount of funds available for investment, projected interest rates, schedule of yields currently available for investment, and the current composition of the asset portfolio for selecting securities to be purchased or sold, for calculating a yield on the asset portfolio, and for evaluating the effect of the selected purchases or sales on the portfolio in order to reject any selection that would result in a yield on the portfolio that is less than the composite cost of the insurance liabilities and in order to reject also any selection that would result in a projected income stream for which the projected cash availability for any period is less than the projected death benefit payment liability for said period.

20. The data processing system of claim 13, wherein said investor billing and reporting means comprises:
- means responsive to said account list means for when a policy holder should be sent a periodic premium notice;
- means responsive to said account list means and said entering means for adjusting the amount of coverage a floating rate zero coupon note purchase insurance policy provides based on the number of floating rate zero coupon notes of each maturity the policy beneficiary would ultimately like to own and the respective numbers of floating rate zero coupon notes owned by at least one of the beneficiary and another holding on the beneficiary's behalf;
- means responsive to said schedule establishing means an said premium notice sending determination means for determining a premium due on each policy on which a premium notice is to be sent; and
- means responsive to said due premium determining means for determining an aggregate premium balance owed by each account-holder who is to be sent a premium notice.

21. A data processing method for administering an insurance program to insure, upon the death of a prospective purchaser of a floating rate zero coupon note, the availability of financial means for purchasing the floating rate zero coupon note, said note being issued by an issuer and designed to fully fund a future liability whose projected due date and whose present cost are known but whose future cost is unknown but can be projected with some risk factor, said method comprising the steps of:
- issuing into a floating rate zero coupon note purchase insurance account a periodically renewable term life insurance policy to insure the availability of financial means to purchase a floating rate zero coupon note having a scheduled maturity date to fund the purchase of a particular service or commodity, each said prospective purchaser holding at least one policy in said floating rate zero coupon note purchase insurance account;
- maintaining an account list of current information for each floating rate zero coupon note purchase insurance account into which a policy has been issued;
- entering insurance purchase, periodic premium payment, death benefit payment request data and customer inquiries into a data processing system;
- responsive to said data entry and operating on said account list, processing periodically said insurance purchase, periodic premium payment, and death benefit payment request data to update said account list;
- responsive to an entered death benefit payment calculating the amount of the death benefit payable upon the death of the insured to at least one designated beneficiary account;
- establishing responsive to said issuing step the schedule of periodic premiums to be charged for said insurance based on a projected death benefit payment and type of life insurance policy selected, wherein the projected death benefit payment under said life insurance policy is determined on the basis of maturity of the floating rate zero coupon note, cost of the service or commodity at the time of purchase, the floating rate zero coupon note issuer's risk premium, and the floating rate zero coupon note issuer's target profit margin, said schedule including a premium payment grace period;
- drawing automatic premium loans to make a premium payment at the end of the premium payment grace period;
- maintaining an asset position list of current information concerning a portfolio of investments purchased with insurance policy premiums and interim investment cash flows;
- selecting a portfolio of securities and updating said asset position list periodically, based on an amount of cash that is available for investment, current composition of the asset portfolio, projected cash need for the following period, projected aggregate floating rate zero coupon note purchase insurance liability schedule, and predefined portfolio selection criteria, thereby generating a stream of cash flows from the asset portfolio that will be sufficient to cover in full in a timely manner the cost of meeting the death benefit payment obligations;
- recording the selected security purchase and sale transaction data to update the asset position list;
- responsive to said issuing step, said account list maintaining step, said entering step, said processing step, said selecting and updating step, and said recording step, periodically generating a report including a summary of insurance purchase, periodic premium payment, and death benefit payment transactions, asset and liability position, and investment performance;
- responsive to said schedule establishing step and said account list maintaining step, sending policy holders periodic premium notices and status reports of their accounts; and
- responsive to said entering step, said account list main step said schedule establishing and step and said sending step, confirming individual transactions and responding to inquiries from customers.

22. The data processing method of claim 21, wherein:
said schedule of periodic premiums is further based on sex of the insured, age of the insured, and risk profile of the insured; and
said projected death benefit payment is further based on current and forecasted future rate of escalation casted general inflation rates, and projected yields available on investment instruments.

23. The data processing method of claim 21, wherein said death benefit calculating step comprises:
- compiling a list of all floating rate zero coupon note purchase insurance policies in an account on which a death benefit payment request has been made;
- responsive to said compiling step, determining which type of life insurance policy each policy in said account is;
- determining whether the death of each insured has been verified;
- responsive to said policy type determining step and said death verification determining step, determining the amount of death benefit payable under each policy for which the death f each insured has been verified; and
- responsive to said compiling step and said amount determining step, determining an aggregate death benefit payable under all such policies in a particular account.

24. The data processing method of claim 21, wherein said automatic premium loan drawing step comprises:

determining when the end of the premium payment grace period under any particular policy has occurred;

determining whether underlying beneficiary floating zero coupon note accounts contain sufficient accrued interest to pay the remaining balance of the premium due in full or to make a partial premium payment;

responsive to said grace period end determining step and said accrued interest sufficiency determining step, calculating the fractional period over which the policy can be extended by utilizing the available accrued interest to pay all or a portion of the periodic premium; and responsive to said fractional period calculating step aggregate daily automatic premium loans.

25. The data processing method of claim 21, wherein said periodic premium schedule establishing step comprises:

determining a future value escalation rate based on information concerning at least the projected rate of change of the cost of the service or commodity;

determining a present value discount rate by subtracting an insurer's risk premium rate and a target profit margin from investment yield obtainable upon investment of funds received from sale of said floating rate zero coupon note purchase insurance policies and reinvestment of any interim cash flows;

responsive to said determined future value escalation rate and said determined present value discount rate, calculating a projected death benefit payment by compounding the current cost of the service or commodity over the life of the floating rate zero coupon note to be purchased with the death benefit payment at said future value escalation rate and discounting at said present value discount rate; and responsive to said projected death benefit, determining a periodic premium on any particular floating rate zero coupon note purchase insurance policy based on the projected death benefit payment and the type of life insurance policy.

26. The data processing method of claim 25 wherein insured, the age of each insured, and the risk profile of each insured.

27. The data processing method of claim 21, wherein said portfolio selecting and updating step comprises:

determining a schedule of projected insurance liabilities based on an aggregate insurance schedule and actuarial data regarding likelihood of death occurring prior to the expiration of the said-up term of each life insurance policy in said schedule;

responsive to said asset position list maintaining means, determining the amount of funds available for investment based on the amount of cash on hand and the current market value of the asset portfolio;

responsive to said determined liability schedule, calculating a composite cost of the insurance liabilities; and responsive to the schedule of projected insurance liabilities, amount of funds available for investment, projected interest rates, schedule of yields currently available for investment, and the current composition of the asset portfolio, selecting securities to be purchased or sold, calculating a yield on the asset portfolio, and evaluating the effect of the selected purchases or sales on the portfolio, rejecting any selection that would result in a yield on the portfolio that is less than the composite cost of the insurance liabilities and rejecting also any selection that would result in a projected income stream for which the projected ash availability for any period is less than the projected death benefit payment liability for said period.

28. The data processing method of claim 21, wherein said policy holder periodic premium notice and report sending step comprises:

responsive to said maintained account list, determining when a policy holder should be sent a periodic premium notice;

responsive to said account list maintaining step and said entering step, adjusting the amount of coverage a floating rate zero coupon note purchase insurance policy provides based on the number of floating rate zero coupon notes of each maturity the policy beneficiary would ultimately like to own and the respective numbers of floating rate zero coupon notes owned by at least one of the beneficiary and another holding on the beneficiary's behalf;

responsive to said established schedule and said premium notice sending determination, determining a premium due on each policy on which a premium notice is to be sent; and responsive to said due premium determination, determining an aggregate premium balance owed by each account holder who is to be sent a premium notice.

29. A data processing system for administering an insurance program to insure, upon the death of a prospective purchaser of a floating rate zero coupon note, the availability of financial means for purchasing the floating rate zero coupon note, said note being issued by an issuer and designed to fully fund a future liability whose projected due date and whose present cost are known but whose future cost is unknown but can be projected with some risk factor, said system comprising:

means for issuing into a floating rate zero coupon note purchase insurance account a periodically renewable term life insurance policy to insure the availability of financial means to purchase a floating rate zero coupon note having a scheduled maturity date to fund the purchase of a particular service or commodity, each said prospective purchaser holding at least one policy in said floating rate zero coupon note purchase insurance account;

account list means for storing an account list of current information for each floating rate zero coupon note purchase insurance amount into which said issuing means has issued a policy:

means for entering insurance purchase, periodic premium and death benefit payment request data and customer inquiries;

means responsive to said entering means and operating on said account list means for processing periodically said insurance purchase, periodic premium payment, and death benefit payment request data to update said account list;

means responsive to a death benefit payment request through said entering means for calculating the amount of the death benefit payable upon the death of the insured to at least one designated beneficiary account;

means responsive to said issuing means for establishing the schedule of periodic premiums to be charged for said insurance based on a projected death benefit payment and type of life insurance policy selected, wherein the projected death benefit payment under said life insurance policy is determined on the basis of maturity of the floating rate zero coupon note, cost of the service or commodity at time of purchase, the floating rate zero coupon note issuer's risk premium, and the floating rate zero coupon note issuer's target profit margin;

asset position list means for storing an asset position of current information concerning a portfolio of investments purchased with insurance policy premiums and interim investment cash flows;

portfolio management means for selecting a portfolio of securities and updating said asset position list periodically, based on an amount of cash that is available for investment, current composition of the asset portfolio, projected cash need for the following period, projected aggregate floating rate zero coupon note purchase insurance liability schedule, and predefined portfolio selection criteria, in order to generate a stream of cash flows from the asset portfolio that will be sufficient to cover in full in a timely manner the cost of meeting death benefit payment obligations;

means for recording the selected security purchase and sale transaction data to update the asset position list;

management reporting means responsive to said issuing means, said account list means, said entering means, said processing means, said portfolio management means and said recording means for periodically generating a report including a summary of insurance purchases, periodic premium payments, and death benefit payment transactions, asset and liability position, and investment performance;

investor billing and reporting means means for sending policy holders periodic premium notices and status reports of their accounts; and transaction and inquiry reporting means responsive to said entering means, said account list means, said schedule establishing means and said investor billing and reporting means for confirming individual transactions and responding to inquiries from customers.

30. The data processing system of claim 29, wherein:
said schedule of periodic premiums is further based on sex of the insured, age of the insured, and risk profile of the insured; and
said projected death benefit payment is further based on current and forecasted future rate of escalation in the cost of the service or commodity, current and forecasted general inflation rates, and projected yields available on investment instruments.

31. The data processing system of claim 29, wherein:
said schedule includes a premium payment grace period; said system further comprising:
means for drawing automatic premium loans to make a premium payment at the end of the premium payment grace period.

32. The data processing system of claim 31, wherein said automatic premium loan drawing means comprises:
means for determining when the end of the premium payment grace period under any particular policy has occurred;

means for determining whether underlying beneficiary floating rate zero coupon note accounts contain sufficient accrued interest to pay the remaining balance of the premium due in full or to make a partial premium payment;

means responsive to said grace period end determining means and said accrued interest sufficiency determining means for calculating the fractional period over which the policy can be extended by utilizing the available accrued interest to pay all or a portion of the periodic premium; and means responsive to said fractional period calculating means for determining aggregate daily automatic premium loans.

33. The data processing system of claim 29, wherein said death benefit calculating means comprises:
means for compiling a list of all the floating rate zero coupon note purchase insurance policies in an account on which a death benefit payment request has been made;
means responsive to said compiling means for determining which type of life insurance policy each policy in said account is;
meats for determining whether the death of each insured has been verified;
means responsive to said policy type determining means and said death verification determining means for determining the amount of death benefit payable under each policy for which the death of each insurent has been verified; and
means responsive to said compiling means and said amount determining means for determining aggregate death benefit payable under all such policies in a particular account.

34. The data processing system of claim 29, wherein said periodic premium schedule establishing means comprises:
means for determining a future value rate based on information concerning at least the projected rate of change of the cost of the service or commodity;
means for determining a present value discount rate by ting an insurer's risk premium rate and a target profit margin from investment yield obtainable upon investment of funds received from the sale of said floating rate zero coupon note purchase insurance policies and reinvestment of any interim cash flows;
means responsive to said determined future value rate and said determined present value discount rate for calculating a projected death benefit payment by compounding the current cost of the service or commodity over the life of the floating rate zero coupon note to be purchased with the death benefit payment at said future value escalation rate and discounting at said present value discount rate; and
means responsive to said projected death benefit for determining a periodic premium on any particular floating rate zero coupon note purchase insurance policy based on the projected death benefit payment and the type of life insurance policy.

35. The data processing system of claim 34, wherein said periodic premium determining means further bases said periodic premium on the sex of each insured, the age of each insured, and the risk profile of each insured.

36. The data processing system of claim 29, wherein said portfolio management and updating means comprises:

means for determining a schedule of projected insurance liabilities based on an aggregate insurance schedule and actuarial data regarding likelihood of death occurring prior to the expiration of the paid-up term of each life insurance policy in said schedule;

means responsive to said asset position list means for . the amount of funds available for investment based on the amount of cash on hand and the current market value of the asset portfolio;

means responsive to said liability schedule determining means for calculating a composite cost of the insurance liabilities; said means responsive to the schedule of projected insurance liabilities, amount of funds available for investment, schedule of yields currently available for investment, and the current composition of the asset portfolio for selecting securities to be purchased or sold, for calculating a yield on the asset portfolio and for evaluating the effect of the selected purchases or sales on the portfolio in order to reject any selection that would result in a yield on the portfolio that is less than the composite cost of the insurance liabilities and in order to reject also any selection that would result in a projected income stream for which the projected cash availability for any period is less than the projected death benefit payment liability for said period.

37. The data processing system of claim 29, wherein said investor billing and reporting means comprises:

means responsive to said account list means for determining when a policy holder should be sent a periodic premium notice;

means responsive to said account list means and said entering means for adjusting the amount of coverage a floating rate zero coupon note purchase insurance policy provides based on the number of floating rate zero coupon notes of each maturity the policy beneficiary would ultimately like to own and the respective numbers of floating rate zero coupon notes owned by at least one of the beneficiary and another holding on the beneficiary's behalf;

means responsive to said schedule establishing means and said premium notice sending determination means for determining a premium due on each policy on which a premium notice is to be sent; and means responsive to said due premium determining means for determining an aggregate premium balance owed by each account holder who is to be sent a premium notice.

38. A data processing method for administering an insurance program to insure, upon the death of a prospective purchaser of a floating rate zero coupon note, the availability of financial means for purchasing the floating rate zero coupon note, said note being issued by an issuer and designed to fully fund a future liability whose projected due date and whose present cost are known but whose future cost is unknown but can be projected with some risk factor, said method comprising the steps of:

issuing into a floating rate zero coupon note purchase insurance account a periodically renewable term life insurance policy to insure the availability of financial means to purchase a floating rate zero coupon note having a scheduled maturity date to fund the purchase of a particular service or commodity, each said prospective purchaser holding at least one policy in said floating rate zero coupon note purchase insurance account;

maintaining an account list of current information for each floating rate zero coupon note purchase insurance account into which a policy has been issued;

entering insurance purchase, periodic premium payment, and death benefit payment request data and customer inquiries into a data processing system;

responsive to said data entry and operating on said account list, processing periodically said insurance purchase, periodic premium payment, and death benefit payment request data to update said account list;

responsive to an entered death benefit payment request the amount of the death benefit payable upon the death of the insured to at least one designated beneficiary account;

establishing responsive to said issuing step the schedule of periodic premiums to be charged for said insurance based on a projected death benefit payment and type of life insurance policy selected, wherein the projected death benefit payment under said life insurance policy is determined on the basis of maturity of the floating rate zero coupon note, cost of the service or commodity at the time of purchase, the floating rate zero coupon note issuer's risk premium, and the floating rate zero coupon note issuer's target profit margin;

maintaining an asset position list of current information concerning a portfolio of investments purchased with insurance policy premiums and interim investment cash flows;

selecting a portfolio of securities and updating said asset position list periodically, based on an amount of cash that is available for investment, current composition of the asset portfolio, projected cash need for the following period, projected aggregate floating rate zero coupon note purchase insurance liability schedule, and predefined portfolio selection criteria, thereby generating a stream of cash flows from the asset portfolio that will be sufficient to cover in full in a timely manner the cost of meeting the death benefit payment obligations;

recording the selected security purchase and sale scan data to update the asset position list;

responsive to said issuing step, said account list step, said entering step, said processing step, said selecting and updating step, and said recording step, periodically generating a report including a summary of insurance purchase, periodic premium payment, and death benefit payment transactions, asset and liability position, and investment performance;

responsive to said schedule establishing step and said account list maintaining step, sending policy holders periodic premium notices and status reports of their accounts; and responsive to said entering step, said account list maintaining step, said schedule establishing step and said sending step, confirming individual transactions and responding to inquiries from customers.

39. The data processing method of claim 38 wherein:

said schedule of periodic premiums is further based on sex of the insured, age of the insured, and risk profile of the insured; and said projected death benefit payment is further base on current and forecasted future rate of escalation in the cost of the service or commodity, current and forecasted general inflation rates, and projected yields available on investment instruments.

40. The data processing method of claim 38, wherein: said schedule includes a premium payment trace period; said method further comprising the step of:
drawing automatic premium loans to make a premium pa the end of the premium payment grace period.

41. The data processing method of claim 40, wherein said automatic premium loan drawing step comprises:
determining when the end of the premium payment grace period under any particular policy has occurred;
determining whether underlying beneficiary floating rate zero coupon note accounts contain sufficient accrued interest to pay the remaining balance of the premium due in full or to make a partial premium payment;
responsive to said grace period end determining step and said accrued interest sufficiency determining step, calculating the fractional period over which the policy can be extended by utilizing the available accrued interest to pay all or a portion of the periodic premium; and
responsive to said frictional period calculating step, determining aggregate daily automatic premium loans.

42. The data processing method of claim 38, wherein said death benefit calculating step comprises:
compiling a list of all floating rate zero coupon note purchase insurance policies in an account on which a death benefit payment request has been made;
responsive to said compiling step, determining which type of life insurance policy each policy in said account is;
determining whether the death of each insured has been verified;
responsive to said policy type determining step and said death verification determining step, determining the amount of death benefit payable under each policy for which the death of each insured has been verified; and
responsive to said compiling step ant said amount determining step, determining an aggregate death benefit payable under all such policies in a particular account.

43. The data processing method of claim 38, wherein said periodic premium schedule establishing step comprises:
determining a future value escalation rate based on information concerning at least the projected rate of change of the cost of the service or commodity;
determining a present value discount rate by subtracting an insurer's risk premium rate and a target profit margin from investment yield obtainable upon investment of funds received from sale of said floating rate zero coupon note purchase insurance policies and reinvestment of any interim cash flows;
responsive to said determined future value escalation rate and said determined present value discount rate, calculating a projected death benefit payment by compounding the current cost of the service or commodity over the life of the floating rate zero coupon note to be purchased with the death benefit payment at said future value escalation rate and discounting at said present value discount rate; and
responsive to said projected death benefit, determining a periodic premium on any particular floating rate zero coupon note purchase insurance policy based on the projected death benefit payment and the type of life insurance policy.

44. The data processing method of claim 43 wherein said periodic premium is further based on the sex of each insured, the age of each insured, and the risk profile of each insured.

45. The data processing method of claim 38, wherein said portfolio selecting and updating step comprises:
determining a schedule of projected insurance liabilities based on an aggregate insurance schedule and actuarial data regarding likelihood of death occurring prior to the expiration of the paid-up term of each life insurance policy in said schedule;
responsive to said asset position list maintaining means, determining the amount of funds available for investment based on the amount of cash on hand and the current market value of the asset portfolio;
responsive to said determined liability schedule, a composite cost of the insurance liabilities; and
responsive to the schedule of projected insurance liabilities, amount of funds available for investment, schedule of yields currently available for investment, and the current composition of the asset portfolio, selecting securities to be purchased or sold, calculating a yield on the asset portfolio, and evaluating the effect of the selected purchases or sales on the portfolio, rejecting any selection that would result in a yield on the portfolio that is less than the composite cost of the insurance liabilities and rejecting also any selection that would result in a projected income stream for which the projected cash availability for any period is less than the projected death benefit payment liability for said period.

46. The data processing method of claim 38, wherein said policy holder periodic premium notice and report sending step comprises:
responsive to said maintained account list determining when a policy holder should be sent a periodic premium notice;
responsive to said account list maintaining step and said entering step, adjusting the amount of coverage a floating rate zero coupon note purchase insurance policy provides based on the number of floating rate zero coupon notes of each maturity the policy beneficiary would ultimately like to own and the respective numbers of floating rate zero coupon notes owned by at least one of the beneficiary and another holding on the beneficiary's behalf;
responsive to said established schedule and said premium notice sending determination, determining a premium due on each policy on which a premium notice is to be sent; and
responsive to said due premium determination, determining an aggregate premium balance owed by each account holder who is to be sent a premium notice.

47. A data processing system for administering an insurance program to insure, upon the death of a prospective purchaser of a floating rate zero coupon note, the availability of financial means for purchasing the floating rate zero coupon note, said note being issued by an issuer and designed to fully fund a future liability whose projected due date and whose present cost are known but whose future cost is unknown but can be projected with some risk factor, said system comprising:

- means for issuing into a floating rate zero coupon note purchase insurance account a periodically renewable term life insurance policy to insure the availability of financial means to purchase a floating rate zero coupon note having a scheduled maturity date to fund the purchase of a particular service or commodity, each said prospective purchaser holding at least one policy in said floating rate zero coupon note purchase insurance account;
- account list means for storing an account list of information for each floating rate zero coupon note purchase insurance account into which said issuing means has issued a policy;
- means for entering insurance purchase, periodic premium payment, and death benefit payment request data and customer inquiries;
- means responsive to said entering means and operating on said account list means for processing periodically said insurance purchase, periodic premium payment, and death benefit payment request data to update said account
- means responsive to a death benefit payment request entered through said entering means for calculating the amount of the death benefit payable upon the death of the insured to at least one designated beneficiary account;
- means responsive to said issuing means for establishing the schedule of periodic premiums to be charged for said insurance based on a projected death benefit payment and type of life insurance policy selected, wherein the projected death benefit payment under said life insurance policy is determined on the basis of maturity of the floating rate zero coupon note, cost of the service or commodity at time of purchase, the floating rate zero coupon note issuer's risk premium, and the floating rate zero coupon note issuer's target margin;
- management reporting means responsive to said issuing means, said account list means, said entering means and said processing means for periodically generating a report including a summary of insurance purchases, periodic premium payments and death benefit payment transactions;
- investor billing and reporting means responsive to schedule establishing means and said account list means for sending policy holders periodic premium notices and status reports of their accounts; and
- transaction and inquiry reporting means responsive said entering means, said account list means, said schedule establishing means and said investor billing and reporting means for confirming individual transactions and responding to inquiries from customers.

48. The data processing system of claim 47, wherein:
said schedule of periodic premiums is further based on sex of the insured, age of the insured, and risk profile of the insured; and
said projected death benefit payment is further based on current and forecasted future ate of escalation in the cost of the service or commodity, current and forecasted general inflation rates, and projected yields available on investment instruments.

49. The data processing system of claim 47, wherein: said schedule includes a premium payment grace period; said system further comprising:
means for drawing automatic premium loans to make a pr payment at the end of the premium payment grace period.

50. The data processing system of claim 49, wherein said automatic premium loan drawing means comprises:
- means for determining when the end of the premium payment grace period under any particular policy has occurred;
- means for determining whether underlying beneficiary floating rate zero coupon note accounts contain sufficient accrued interest to pay the remaining balance of the premium due in full or to make a partial premium payment;
- means responsive to said grace period end determining means and said accrued interest sufficiency determining means for calculating the fractional period over which the policy can be extended by utilizing the available accrued interest to pay all or a portion of the periodic premium; and
- means responsive to said fractional period calculating means for determining aggregate daily automatic premium loans.

51. The data processing system of claim 47 further comprising:
- asset position list means for storing an asset position list of current information concerning a portfolio of investments purchased with insurance policy premiums and interim investment cash flows;
- portfolio management means for selecting a portfolio of securities and updating said asset position list periodically, based on an amount of cash that is available for investment, current composition of the asset portfolio, projected cash need for the following period, projected aggregate floating rate zero coupon note purchase insurance liability schedule, and predefined portfolio election criteria, in order to generate a stream of cash flows from the asset portfolio that will be sufficient to cover in full in a timely manner the cost of meeting death benefit payment obligations; and
- means for recording the selected security purchase and sale transaction data to update the asset position list.

52. The data processing system of claim 51, wherein said portfolio management and updating means comprises:
- means for determining a schedule of projected insurance liabilities based on an aggregate insurance schedule and actuarial data regarding likelihood of death occurring prior to the expiration of the paid-up term of each life insurance policy in said schedule;
- means responsive to said asset position list means for determining the amount of funds available for investment based on the amount of cash on hand and the current market value of the asset portfolio;
- means responsive to said liability schedule determining means for calculating a composite cost of the insurance liabilities; and
- means responsive to the schedule of projected insurance liabilities, amount of funds available for investment, schedule of yields currently available for investment, and the current composition of the asset portfolio for selecting securities to be purchased or sold, for calculating a yield on the asset portfolio and for evaluating the effect of the selected purchases or sales on the portfolio in order to reject any selection that would result in a yield on the portfolio that is less than the composite cost of the insurance liabilities and in order to reject also any selection that would result in a projected income stream for which the projected cash availability for any period is less than the projected death benefit liability for said period.

53. The data processing system of claim 47, wherein said death benefit calculating means comprises:
    means for compiling a list of all the floating rate zero coupon note purchase insurance policies in an account on which a death benefit payment request has been made;
    means responsive to said compiling means for determining which type of life insurance policy each policy in said account is;
    means for determining whether the death of each insured has been verified;
    means responsive to said policy type determining means and said death verification determining means for determining the amount of death benefit payable under each policy for which the death of each insured has been verified; and
    means responsive to said compiling means and said amount determining means for determining aggregate death benefit payable under all such policies in a particular account.

54. The data processing system of claim 47, wherein said periodic premium schedule establishing means comprises:
    means for determining a future value escalation rate based on information concerning at least the projected rate of change of the cost of the service of commodity;
    means for determining a present value discount rate by subtracting an insurer's risk premium rate and a target profit margin from investment yield obtainable upon investment of funds received from the scale of said floating rate zero coupon note purchase insurance policies and reinvestment of any interim cash flows;
    means responsive to said terminated future value escalation rate and said determined present value discount rate for calculating a projected death benefit payment by compounding the current cost of the service or commodity over the life of the floating rate zero coupon note to be purchased with the death benefit payment at said future value escalation rate and discounting at said present value discount rate; and
    means responsive to said projected death benefit for determining a periodic premium on any particular floating rate zero coupon note purchase insurance policy based on the projected death benefit payment and the type of life insurance policy.

55. The data processing system of claim 54, wherein said periodic premium determining means further bases said periodic premium on the sex of each insured, the age of each insured, and the risk profile of each insured.

56. The data processing system of claim 47, wherein said investor billing and reporting means comprises:
    means responsive to said account list means for when a policy holder should be sent a periodic premium notice;
    means responsive to said account list means and said entering means for adjusting the amount of coverage a floating rate zero coupon note purchase insurance policy provides based on the number of floating rate zero coupon notes of each maturity the policy beneficiary would ultimately like to own and the respective numbers of floating rate zero coupon notes owned by at least one of the beneficiary and another holding on the beneficiary's behalf;
    means responsive to said schedule establishing means and said premium notice sending determination means for determining a premium due on each policy on which a premium notice is to be sent; and
    means responsive to said due premium determining means for determining an aggregate premium balance owed by each account holder who is to be sent a premium notice.

57. A data processing method for administering an insurance program to insure, upon the death of a prospective purchaser of a floating rate zero coupon note, the availability of financial means for purchasing the floating rate zero coupon note, said note being issued by an issuer and designed to fully fund a future liability whose projected due date and whose present cost are known but whose future cost is unknown but can be projected with some risk factor, said method comprising the step of:
    issuing into a floating rate zero coupon note purchase insurance account a periodically renewable term life insurance policy to insure the availability of financial means to purchase a floating rate zero coupon note having a scheduled maturity date to fund the purchase of a particular service or commodity, each said prospective purchaser holding at least one policy in said floating rate zero coupon note purchase insurance account;
    maintaining an account list of current information for each floating rate zero coupon note purchase insurance account into which a policy has been issued;
    entering insurance purchase, periodic premium payment, an death benefit payment request data and customer inquiries into a data processing system;
    responsive to said data entry and operating on said account list, processing periodically said insurance purchase, periodic premium payment, and death benefit payment request data to update said account list;
    responsive to an entered death benefit payment request, calculating the amount of the death benefit payable upon the death of the insured to at least one designated beneficiary account;
    establishing responsive to said issuing step the schedule of periodic premiums to be charged for said insurance based on a projected death benefit payment and type of life insurance policy selected, wherein the projected death benefit payment under said life insurance policy is determined on the basis of maturity of the floating rate zero coupon note, cost of the service or commodity at the time of purchase, the floating rate zero coupon note issuer's risk premium, and the floating rate zero coupon note issuer's target profit margin;
    responsive to said issuing step, said account list maintaining step, said entering step and said processing step, periodically generating a report including a summary of insurance purchase, periodic premium payment, and death benefit payment transactions;
    responsive to said schedule establishing step and said account list maintaining step, sending policy holders periodic premium notices and status reports of their accounts; and responsive to said entering step, said account list main-step, said schedule establishing step and said sending step, confirming individual transactions and responding- to inquiries from customers.

58. The data processing method of claim 57 wherein:
said schedule of periodic premiums is further based on sex of the insured, ate of the insured, and risk profile of the insured; and
said projected death benefit payment is further based on current and forecasted future rate of escalation in the cost of the service or commodity, current and forecasted general inflation rates, and projected yields available on investment instruments.

59. The data processing method of claim 57 wherein:
said schedule includes a premium payment grace period said method further comprising the step of:
at the end of the premium payment grace period.

60. The data processing method of claim 59, wherein said automatic premium loan drawing step comprises:
determining when the end of the premium payment grace period under any particular policy has occurred;
determining whether underlying beneficiary floating rate zero coupon note accounts contains sufficient accrued interest to pay the remaining balance of the premium due in full or to make a partial premium payment;
responsive to said grace period end determining step and said accrued interest sufficiency determining step, calculating the fractional period over which the policy can be extended by utilizing the available accrued interest to pay all or a portion of the periodic premium; and
responsive to said fractional period calculating step, determining aggregate daily automatic premium loans.

61. The data processing method of claim 57 further comprising the steps of:
maintaining an asset position list of current information concerning a portfolio of investments purchased with insurance policy premiums and interim investment cash flows;
selecting a portfolio of securities and updating said asset position list periodically, based on an amount of cash that is available for investment, current composition of the asset portfolio, projected cash need for the following period, projected aggregate floating rate zero coupon note purchase insurance liability schedule, and predefined portfolio selection criteria, thereby generating a stream of cash flows from the asset portfolio that will be sufficient to cover in full in a timely manner the cost of meeting the death benefit payment obligations; and
recording the selected security purchase and sale transaction data to update the asset position list.

62. The data processing method of claim 61, wherein said portfolio selecting and updating step comprises:
determining a schedule of projected insurance liabilities based on an aggregate insurance schedule and actuarial data regarding likelihood of death occurring prior to the expiration of the paid-up term of each life insurance policy in said schedule;
responsive to said asset position list maintaining means, determining the amount of funds available for investment based on the amount of cash on hand and the current market value of the asset portfolio;
responsive to said terminated liability schedule, calculating a composite cost of the insurance liabilities; and
responsive to the schedule of projected insurance liabilities, amount of funds available for investment, schedule of yields currently available for investment, and the current composition of the asset portfolio, selecting securities to be purchased or sold, calculating a yield on the asset portfolio and evaluating the effect of the selected purchases or sales on the portfolio, rejecting any selection that would result in a yield on the portfolio that is less than the composite cost of the insurance liabilities and reflecting also any selection that would result in a projected income stream for which the projected cash availability for any period is less than the projected death benefit payment liability for said period.

63. The data processing method of claim 57, wherein said death benefit calculating step comprises:
compiling a list of all floating rate zero coupon note purchase insurance policies in an account on which a death benefit payment request has been made;
responsive to said compiling step, determining which type of life insurance policy each policy in said account is;
determining whether the death of each insured has been verified;
responsive to said policy type determining step and said death verification determining step, determining the amount of death benefit payable under each policy for which the death of each insured has been verified; and
responsive to said compiling step and said amount determining step, determining an aggregate death benefit payable under all such policies in a particular account.

64. The data processing method of claim 57, wherein schedule establishing step comprises:
determining a future value escalation rate based on information concerning at least the projected rate of change of the cost of the service or commodity;
determining a present value discount rate by subtracting an insurer's risk premium rate and a target profit margin from investment yield obtainable upon investment of funds received from sale of said floating rate zero coupon note purchase insurance policies and reinvestment of any interim cash flows;
responsive to said determined future value escalation rate and said determined present value discount rate, calculating a projected death benefit payment by compounding the current cost of the service or commodity over the life of the floating rate zero coupon note to be purchased with the death benefit payment at said future value escalation rate and discounting at said present value discount rate; and
responsive to said projected death benefit, determining a periodic premium on any particular floating rate zero coupon note purchase insurance policy based on the projected death benefit payment and the type of life insurance polity.

65. The data processing system of claim 64 wherein said periodic premium is further based on the sex of each insured, the age of each insured, and the risk profile of each insured.

66. The data processing method of claim 57, wherein said policy holder periodic premium notice and report sending step comprises:

responsive to said maintained determining when a policy holder should be sent a periodic premium notice;

responsive to said account list maintaining step and entering step, adjusting the amount of coverage a floating rate zero coupon note purchase insurance policy provides based on the number of floating rate zero coupon notes of each maturity the policy beneficiary would ultimately like to own and the respective numbers of floating rate zero coupon notes owned by at least one of the beneficiary and another holding on the beneficiary's behalf;

responsive to said established schedule and said premium notice sending determination, determining a premium due on each policy on which a premium notice is to be sent; and responsive to said due premium determination, determining an aggregate premium balance owed by each account holder who is to be sent a premium notice.

* * * * *

UNITED STATES PATENT AND TRADEMARK OFFICE
CERTIFICATE OF CORRECTION

PATENT NO. : 4,839,804

DATED : June 13, 1989

INVENTOR(S) : Peter A. Roberts et al.

It is certified that error appears in the above-identified patent and that said Letters Patent is hereby corrected as shown below:

```
FIG. 1A, box 104, "BENIFIT" should be -- BENEFIT--

Column 1, line 52, "most" should be -- cost --

Column 4, line 65, "be" should be -- by --

Column 17, line 2, "122" should be -- 522 --

Column 19, line 19, "ar" should be -- are --

Claim 2, column 27, line 32, "papable" should be -- payable --;
      "at" should be -- all --; "pn" should be -- in --.

Claim 3, column 27, line 34, "Processing" should be
      -- The data processing --.

Claim 4, column 28, line 11, "o" should be -- on --.

Claim 6, column 28, line 46, "Processing" should be
      -- The data processing --;

line 48, should be deleted in its entirety;

line 49, after "list" should be inserted
      -- means --;

line 50, "[an annual" should be deleted;
```

UNITED STATES PATENT AND TRADEMARK OFFICE
CERTIFICATE OF CORRECTION

PATENT NO. : 4,839,804                                      Page 2 of 8

DATED       : June 13, 1989

INVENTOR(S) : Peter A. Roberts et al.

It is certified that error appears in the above-identified patent and that said Letters Patent is hereby corrected as shown below:

line 52, after "account" should be inserted -- list means --;

line 62, "a" should be -- and --.

Claim 7, column 29, line 1, "Method" should be -- A data processing method --;

line 32, "ca ." should be -- calculating --;

line 60, "update" should be -- updating --;

column 30, line 5, "main" should be -- maintaining --;

line 13, "have" should be -- responsive --;

line 17, "mail" should be -- maintaining --.

Claim 8, column 30, line 29, after "insured" should be inserted -- has been --;

line 31, "an" should be -- and --.

Claim 12, column 31, line 55, "an" should be -- and --.

Claim 13, column 32, line 37, "en" should be -- entered --;

line 44, after "insurance" should be inserted -- policy --;

line 48, "Commodity" should be -- commodity --;

UNITED STATES PATENT AND TRADEMARK OFFICE
CERTIFICATE OF CORRECTION

PATENT NO. : 4,839,804

DATED : June 13, 1989

INVENTOR(S) : Peter A. Roberts et al.

It is certified that error appears in the above-identified patent and that said Letters Patent is hereby corrected as shown below:

line 52, "race" should be -- grace --;

line 55, after "a" should be inserted -- premium --; "race" should be -- grace --;

line 58, "Concerning" should be -- concerning --;

column 33, line 2, "Cover" should be -- cover --;

line 5, "an" should be -- and sale --;

line 17, "s" should be -- schedule --.

Claim 17, column 34, line 13, after "by" should be inserted -- subtracting --.

Claim 20, column 35, line 3, after "for" should be inserted -- determining --;

line 17, "an" should be -- and --.

Claim 21, column 35, line 48, after "ment," should be inserted -- and --;

line 55, after "payment" should be inserted -- request, --;

UNITED STATES PATENT AND TRADEMARK OFFICE
CERTIFICATE OF CORRECTION

PATENT NO. : 4,839,804

DATED : June 13, 1989

INVENTOR(S) : Peter A. Roberts et al.

It is certified that error appears in the above-identified patent and that said Letters Patent is hereby corrected as shown below:

column 36, line 36, "main" should be -- maintaining --;

line 37, "step" should be -- step, --; "and" (first occurrence) should be deleted.

Claim 22, column 36, line 46, before "casted" should be inserted -- in the cost of the service or commodity, current and fore- --.

Claim 23, column 36, line 61, "f" should be -- of --.

Claim 24, column 37, line 15, "step" should be -- step, determining --.

Claim 26, column 37, line 43, after "wherein" should be inserted -- said periodic premium is further based on the sex of each --.

Claim 27, column 37, line 51, "said-up" should be -- paid-up --;

column 38, line 5, "ash" should be -- cash --.

Claim 29, column 38, line 54, "amount" should be -- account --;

line 57, after "mium" should be inserted -- payment, --;

UNITED STATES PATENT AND TRADEMARK OFFICE
CERTIFICATE OF CORRECTION

PATENT NO. : 4,839,804  Page 5 of 8
DATED : June 13, 1989
INVENTOR(S) : Peter A. Roberts et al.

It is certified that error appears in the above-identified patent and that said Letters Patent is hereby corrected as shown below:

line 64, after "request" should be inserted -- entered --;

column 39, line 12, after "position" (second occurrence) should be inserted -- list --;

line 40, after "means" (first occurrence) should be inserted -- responsive to said schedule establishing means and said account list --.

Claim 33, column 40, line 24, "meats" should be -- means --;

line 30, "insurent" should be -- insured --.

Claim 34, column 40, line 39, after "value" should be inserted -- escalation --;

line 43, "ting" should be -- subtracting --;

line 49, after "value" should be inserted -- escalation --.

Claim 36, column 41, line 8, "." should be -- determining --.

Claim 38, column 42, line 15, "quest" should be -- quest, calculating --;

line 44, "scan" should be -- transaction --.

UNITED STATES PATENT AND TRADEMARK OFFICE
CERTIFICATE OF CORRECTION

PATENT NO. : 4,839,804

DATED : June 13, 1989

INVENTOR(S) : Peter A. Roberts et al.

It is certified that error appears in the above-identified patent and that said Letters Patent is hereby corrected as shown below:

Claim 40, column 43, line 5, "trace" should be -- grace --;

line 8, "pa" should be -- payment at --.

Claim 41, column 43, line 26, "frictional" should be -- fractional --.

Claim 42, column 43, line 44, "ant" should be -- and --.

Claim 45, column 44, line 22, after "schedule," should be inserted -- calculating --.

Claim 47, column 45, line 42, after "target" should be inserted -- profit --;

line 49, after "to" should be inserted -- said --.

Claim 48, column 45, line 64, "ate" should be -- rate --.

Claim 49, column 46, line 4, "pr" should be -- premium --.

Claim 51, column 46, line 38, "election" should be -- selection --.

Claim 52, column 47, line 8, after "benefit" should be inserted -- payment --.

UNITED STATES PATENT AND TRADEMARK OFFICE
CERTIFICATE OF CORRECTION

PATENT NO. : 4,839,804
DATED : June 13, 1989
INVENTOR(S) : Peter A. Roberts et al.

It is certified that error appears in the above-identified patent and that said Letters Patent is hereby corrected as shown below:

Claim 54, column 47, line 34, "of" (fourth occurrence) should be -- or --;

line 40, "scale" should be -- sale --;

line 43, "terminated" should be -- determined --.

Claim 56, column 47, line 63, after "for" should be inserted -- determining --.

Claim 57, column 48, line 40, "an" should be -- and --;

column 49, line 3, "main" should be -- maintaining --;

line 4, "- step," should be -- step, --;

line 6, "responding-" should be -- responding --.

Claim 58, column 49, line 9, "ate" should be -- age --.

Claim 59, column 49, line 19, before "at" should be inserted -- drawing automatic premium loans to make a premium payment --.

UNITED STATES PATENT AND TRADEMARK OFFICE
CERTIFICATE OF CORRECTION

PATENT NO. : 4,839,804
DATED : June 13, 1989
INVENTOR(S) : Peter A. Roberts et al.

It is certified that error appears in the above-identified patent and that said Letters Patent is hereby corrected as shown below:

Claim 62, column 50, line 3, "terminated" should be -- determined --;

column 50, line 16, "reflecting" should be -- rejecting --.

Claim 64, column 50, line 64, "polity." should be -- policy. --.

Claim 66, column 51, line 4, after "maintained" should be inserted -- account list, --;

line 7, after "and" should be inserted -- said --.

Signed and Sealed this

Fifth Day of November, 1991

Attest:

HARRY F. MANBECK, JR.

*Attesting Officer*    *Commissioner of Patents and Trademarks*